United States Patent
Govindassamy et al.

(10) Patent No.: US 9,794,930 B1
(45) Date of Patent: Oct. 17, 2017

(54) METHOD AND APPARATUS FOR PACKET DATA UNIT PROCESSING FOR RETRANSMISSION

(71) Applicant: MBIT WIRELESS, INC., Newport Beach, CA (US)

(72) Inventors: Sivakumar Govindassamy, Irvine, CA (US); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 97 days.

(21) Appl. No.: 14/996,488

(22) Filed: Jan. 15, 2016

(51) Int. Cl.
*H04W 4/00* (2009.01)
*H04W 72/04* (2009.01)
*H04W 52/02* (2009.01)
*H04L 12/741* (2013.01)
*H04L 5/00* (2006.01)

(52) U.S. Cl.
CPC ......... *H04W 72/044* (2013.01); *H04L 5/0055* (2013.01); *H04L 45/74* (2013.01); *H04W 52/0222* (2013.01)

(58) Field of Classification Search
None
See application file for complete search history.

(56) References Cited

U.S. PATENT DOCUMENTS

| | | | | |
|---|---|---|---|---|
| 2002/0191544 A1* | 12/2002 | Cheng | ..................... | H04L 29/06 370/236 |
| 2004/0252719 A1* | 12/2004 | Jami | ..................... | H04L 1/0007 370/470 |
| 2007/0291695 A1* | 12/2007 | Sammour | ............. | H04W 36/02 370/331 |
| 2008/0130619 A1* | 6/2008 | Cha | ....................... | H04L 1/1685 370/346 |
| 2008/0226074 A1* | 9/2008 | Sammour | ............. | H04W 12/04 380/270 |
| 2012/0039260 A1* | 2/2012 | Song | ..................... | H04L 1/0045 370/328 |
| 2012/0178438 A1* | 7/2012 | Vashi | .................... | H04W 24/10 455/424 |
| 2014/0341013 A1* | 11/2014 | Kumar | ................ | H04W 28/065 370/229 |

* cited by examiner

*Primary Examiner* — Zewdu A Beyen
(74) *Attorney, Agent, or Firm* — Lerner, David, Littenberg, Krumholz & Mentlik, LLP

(57) ABSTRACT

In data communication systems, data packet processing for transmission and reception may go through different stages such as segmentation or packing of the data packets on the transmission side and duplicate detection, reordering, and reassembly on the reception side. For reliable data transmission between peer entities, acknowledgement based retransmission protocol known as Automatic Repeat Request may be used where each retransmission can further segment previously transmitted data packets. This type of data processing may lead to high memory requirements and high processing requirements. A method and apparatus are disclosed that maintain additional information about the data packets which enables virtual segmentation and packing on the transmitter side and on the receiver side, virtual duplicate detection, reordering and reassembly. Performing the segmentation, packing, duplicate detection, reordering and reassembly operations in virtual manner reduce the memory and processing requirements and this may lead to reduced power consumption and improved user experience.

21 Claims, 18 Drawing Sheets

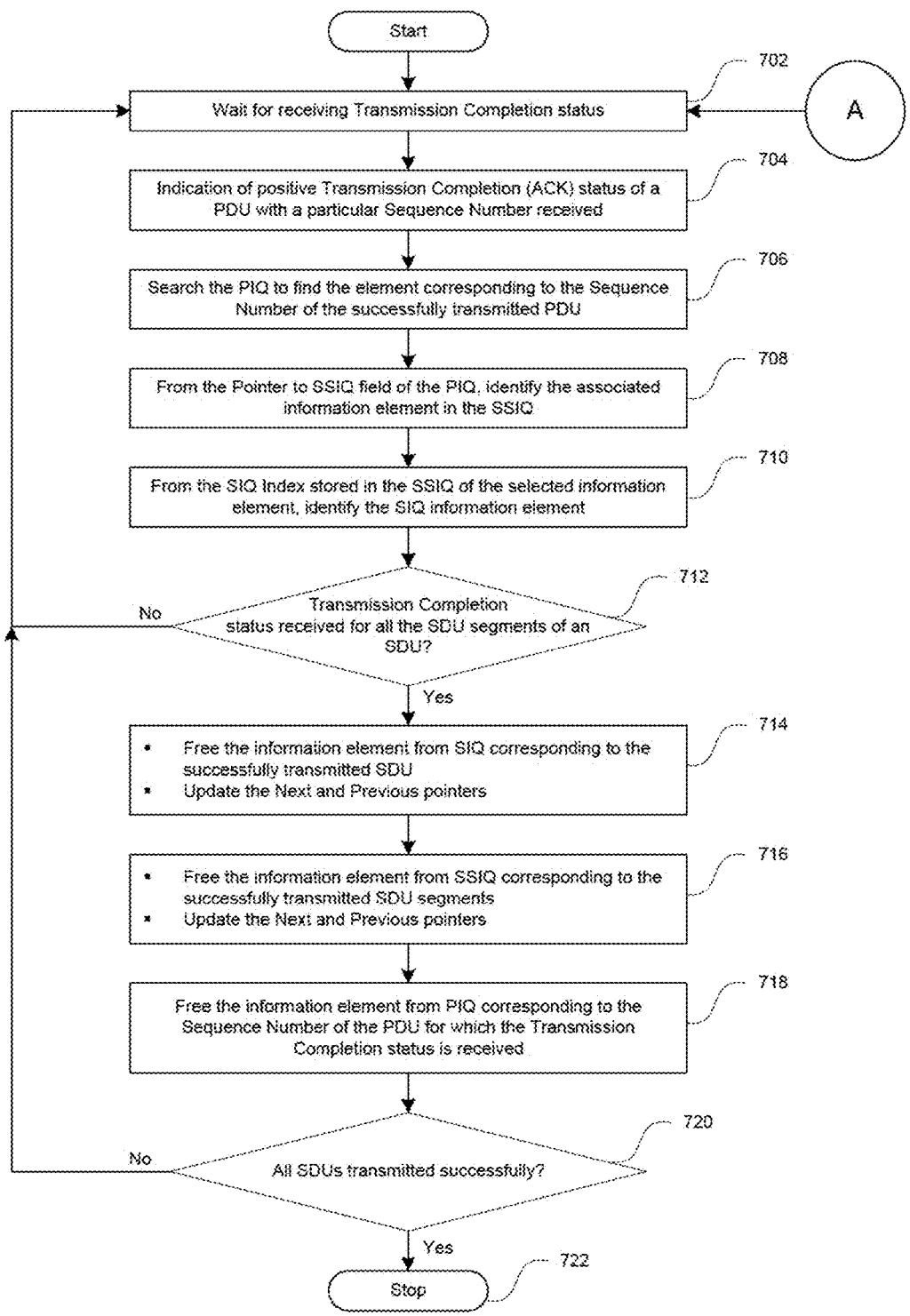

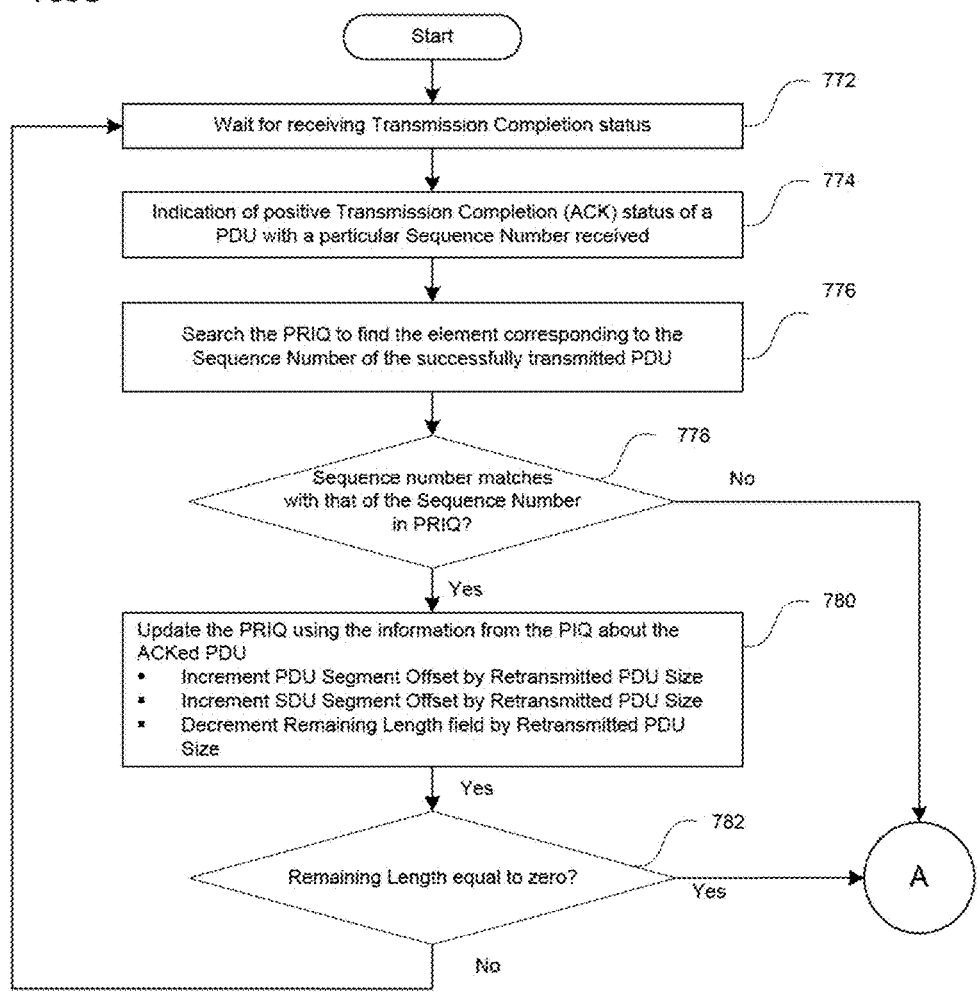

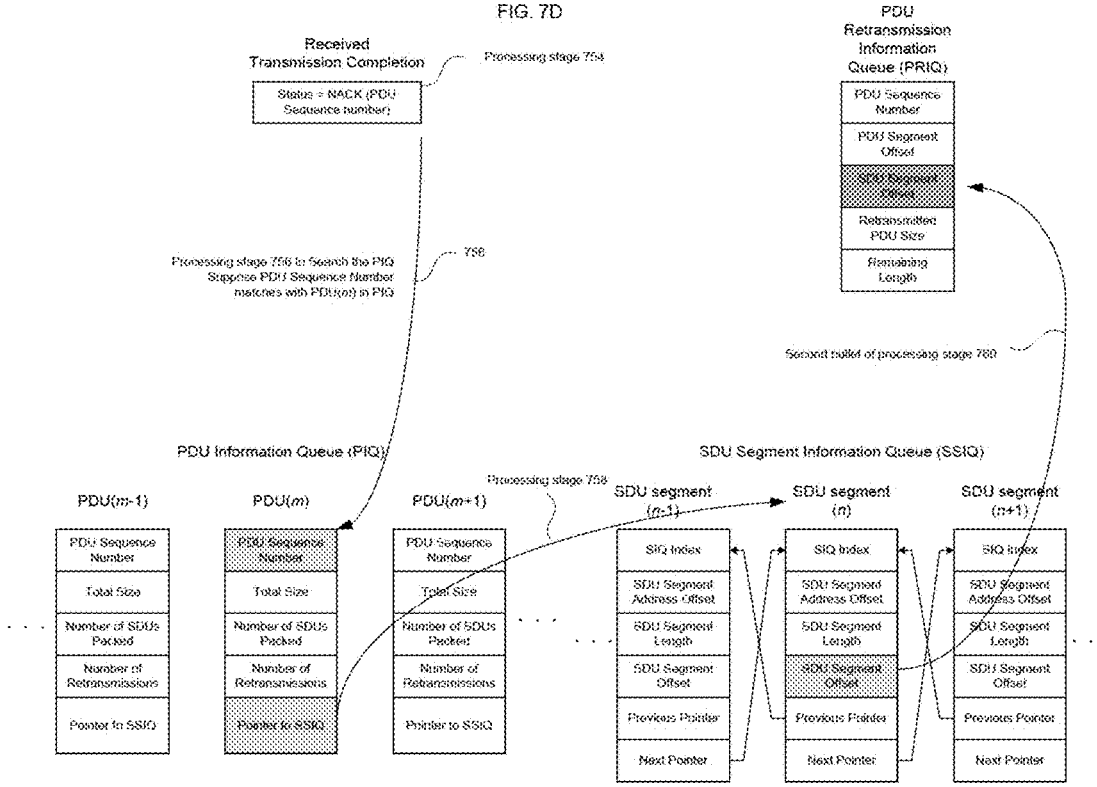

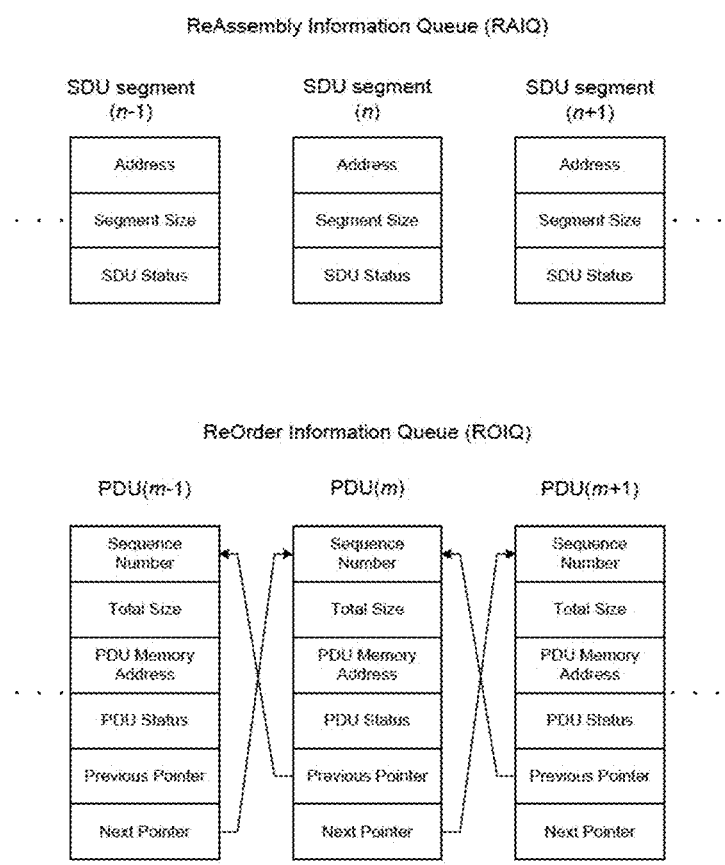

METHOD AND APPARATUS FOR PACKET DATA UNIT PROCESSING FOR RETRANSMISSION

BACKGROUND

In data communication systems, data packet processing for transmission and reception may go through different stages such as segmentation, concatenation or packing of the data packets on the transmission side and duplicate detection, reordering, and reassembly on the reception side. Also in some data communication systems, for reliable data transmission between the peers, an acknowledgement (positive or negative) based retransmission protocol known as Automatic Repeat Request (ARQ) may be used where each retransmission can further segment the previously transmitted data packets. This type of data processing may lead to high memory requirements and high processing requirements.

The services and features of data communication systems may be implemented in distinct layers. The data packets given by an application or upper layer of any protocol may be referred as Service Data Unit (SDU) and the data unit provided to the lower layer may be referred to as Protocol Data Unit (PDU) as shown in FIG. 1. On the transmission side a protocol entity works on the SDU as the input and performs data packet processing. On the receiving side, a protocol entity works on a PDU as the input and performs data packet processing. The data packet processing on the transmission side may add headers or footers or both to an SDU. The data packet processing on the reception side may remove headers or footers or both from the PDU and provide an SDU to an application or upper layer.

When a PDU transmitted by a transmit entity is correctly received by a receiving entity, it may send a positive acknowledgement (ACK) to the transmitting entity. When a PDU transmitted by a transmit entity is not correctly received by a receiving entity, it may send a negative acknowledgement (NACK) to the transmitting entity. As a response to the NACK, the transmitting entity may retransmit a PDU. The retransmitted PDU may have to be resegmented depending on the available transmission resources.

There are many different scenarios in which an SDU may be processed by a protocol entity to generate PDUs using segmentation and packing. An SDU may be divided into two or more parts for transmission and each part is referred herein as an SDU segment. Examples of the data packet processing scenarios on transmission side are illustrated in FIG. 2. Examples of the processing scenarios illustrated in FIG. 2 include transmission of an SDU in a PDU without segmentation or packing, segmentation of an SDU and transmission in two different PDUs, and two different SDUs or SDU segments packed and transmitted in a single PDU. In general, an SDU may be segmented in two or more PDUs and two or more SDU or SDU segments may be packed in a single PDU. In some cases, due to errors in transmission or reception, a PDU may need to be retransmitted. When a PDU is retransmitted, in order to match the available transmission resource size, it may have to be segmented into smaller size called retransmission PDU segments (PDUS). Alternatively, if the available transmission resources are larger than the size of the original PDU, two or more PDUs or PDU segments that need to be retransmitted may be packed into a single PDU. The single packed PDU used for retransmission may still be referred to as retransmission PDU segments. The PDU retransmission examples are illustrated in FIG. 2 by the $PDU_{m+3}$ which may be retransmitted as PDU segments $PDUS_x$ and $PDUS_{x+1}$. The $PDU_{m+4}$ and a segment of $PDU_{m+5}$ may be retransmitted as a PDU segment $PDUS_{x+2}$. The remaining segment of $PDU_{m+5}$ may be retransmitted as a PDU segment $PDUS_{X+3}$.

Similarly, examples of the packet data processing scenarios on the reception side are illustrated FIG. 3. Examples of the processing scenarios illustrated in FIG. 3 include reception of an SDU in a PDU without unpacking or reassembly, reassembly of an SDU from reception of two different PDUs, unpacking of two different SDUs or SDU segments from a single PDU and reassembling an SDU from two different PDUs, and reassembling a retransmitted PDU from multiple PDU segments. In general, an SDU may be reassembled from two or more PDUs and two or more SDU or SDU segments may be unpacked from a single PDU. The PDU retransmission examples at the receiver are illustrated in FIG. 3 by reception of a retransmitted $PDU_{m+3}$ by packing the PDU segments $PDUS_x$ and $PDUS_{x+1}$. The $PDU_{m+4}$ and a segment of $PDU_{m+5}$ are received by retransmitted PDU segment $PDUS_{m+2}$. The remaining segment of $PDU_{m+5}$ is received as retransmitted PDU segment $PDUS_{m+3}$.

As discussed above, when a transmitting entity retransmits a PDU that was previously transmitted, it may lead to segmentation of a single PDU or packing of multiple PDUs.

A method and apparatus are disclosed in application "METHOD AND APPARATUS FOR DATA PACKET PROCESSING", filed Jan. 11, 2016, U.S. application Ser. No. 14/992,229, incorporated by reference herein, that maintain additional information about the data packets which enable virtual segmentation and packing on the transmitter side and similarly, on the receiver side, virtual duplicate detection, reordering and reassembly. Performing the segmentation, packing, duplicate detection, reordering and reassembly operations in virtual manner reduce the memory and processing requirements and this may lead to reduced power consumption and improved user experience.

SUMMARY

A method and apparatus are disclosed that enable data processing during retransmission without actually segmenting, resegmenting or packing. The disclosed method maintains the information about the data packets which are to be retransmitted and enables virtual segmentation, packing, re-segmenting on the transmitter side.

In accordance with an aspect of the present invention, a method for processing a data packet for transmission in a wireless communication system may include: (A) controlling, by a processing device, when a data packet as a new Service Data Unit (SDU) is determined to be received from a first layer of a protocol used in the wireless communication system, creating, for a given new SDU, a new entry in an SDU Information Queue (SIQ) indicating: a Start Address set to a system memory address of the given new SDU, a Total Size set to a size of the given new SDU, a Remaining Length set to the size of the given new SDU, a Previous Pointer set to (i) an index of a previously received SDU in the SIQ, when the SIQ includes an entry for the previously received SDU, and (ii) null, when the given new SDU is a first received SDU, and a Next Pointer set to a next free element in the SIQ configured to store information of a next received SDU; (B) controlling, by the processing device, when a transmission resource is determined to be allocated and a retransmission PDU is determined not to be pending in a PDU Retransmission Information Queue (PRIQ), (a) preparing a data packet as a Protocol Data Unit (PDU) at a second layer of the protocol for transmission, in which the second layer is at a lower level in the protocol than the first layer, (b) updating a PDU Information Queue (PIQ) by setting: a PDU Sequence Number of the PDU to a next sequence number in a predetermined range of sequence numbers, a Total Size to an entire size of the PDU, a Total Number of SDU Segments packed to a total number of whole SDUs or SDU segments to be packed in the PDU, and a Pointer to a SDU Segment Information Queue (SSIQ) to an index of the SSIQ to be updated with information about the whole SDUs or SDU segments packed into the PDU; (c) setting the index of the SSIQ to be updated to an index in the SIQ of a SDU or a segment of an SDU packed in the PDU, (d) when a whole SDU or a first segment of a SDU is packed in the PDU, setting a SDU Segment Address Offset to the Start Address, (e) when a whole SDU or the first segment of a SDU is not packed in the PDU, setting the SDU Segment Address Offset to a sum of the Start Address and the Total Size less the Remaining Length, and (f) setting: a SDU Segment Length to a size of the SDU or the SDU segment packed in the PDU, a SDU Segment Offset to a memory address of the PDU in which the SDU or the SDU segment is packed, the Previous Pointer to an index of a most recently formed entry in the SSIQ, the Next Pointer to an index of a next free entry in the SSIQ, and the Remaining Length to (i) zero, when a whole SDU is packed in the PDU, and (ii) the Remaining length minus the SDU segment length, when at least one SDU segment remains and is not to be packed in the PDU; and (C) controlling, by the processing device, when a transmission resource is determined to be allocated and a retransmission PDU is determined to be pending in the PRIQ, updating the PRIQ by: setting a Retransmitted PDU Size equal to an allocated transmission resource size, and preparing a PDU segment as the retransmission PDU according to the allocated transmission resource size using a PDU Segment Offset and a SDU Segment Offset of the PRIQ.

In one alternative, the method may include controlling, by the processing device, repeatedly performing (A) (B) and (C), until a result of a determination after (B) or (C) is performed is all new received SDUs in the SIQ have been transmitted as a given PDU and the PRIQ does not indicate any retransmission PDU is pending.

In one alternative, the PDU may include one or more SDUs or SDU Segments.

In one alternative, the retransmission of a given PDU may be prioritized over transmission of a new PDU, information for only one PDU Segment may be stored in the PRIQ at a time, and information for the PDU or PDU segment current being retransmitted may be stored in the PRIQ.

In one alternative, a first PDU to be retransmitted from at least one PDU to be retransmitted may be formed as the retransmission PDU.

In one alternative, the retransmission PDU may be one of (i) a same size as the first PDU when transmitted a first time, (ii) a segment of a previously transmitted PDU, and (iii) a segment of two previously transmitted PDUs.

In one alternative, a Number of Retransmissions for the PDU indicated in the PRIQ may be set to a value of one greater than a current value of the Number of Retransmissions when the PDU is transmitted, and the value of the Number of Retransmission may be initialized to zero.

In one alternative, the method may further comprise: (D) controlling, by the processing device, when a positive Transmission Completion Status (ACK) is received for a given PDU having a given Sequence Number, searching the PIQ for an information element corresponding to the given Sequence Number, based on a Pointer to the SSIQ of the information element determined from the searching the PIQ, identifying an associated information element in the SSIQ, from an SIQ Index of the associated information element in the SSIQ, identifying an information element in the SIQ to which the Transmission Completion Status corresponds; (E) controlling, by the processing device, performing (D) until a positive ACK Status for all SDU segments of a given SDU is received, and when a positive ACK status for all SDU segments of the given SDU is determined to be received, releasing the information element in the SIQ corresponding to the given SDU and the information element in the SSQI corresponding to each SDU segment of the given SDU, updating the Next Pointer and the Previous Pointer with regard to each remaining element in the SIQ and the SSIQ, and releasing the information element in the PIQ corresponding to the Sequence Number of the PDU for which the Transmission Complete Status is received; and (F) controlling, by the processing device, when a negative Transmission Completion (NACK) status is received for a given unsuccessfully transmitted PDU, searching the PIQ for a second information element corresponding to a Sequence Number of the given unsuccessfully transmitted PDU, based on a Pointer to the SSIQ in the PDU determined from the second information element, identifying an associated information element in the SSQI, setting: the PDU Segment Offset to zero, the SDU Segment Offset by indexing into the associated information element of the SSQI identified based on the Pointer to the SSIQ of the second information element determined from the searching the PIQ, and the Remaining Length to Total Size from the PIQ.

In one alternative, the method may further comprise: (G) controlling, by the processing device, when the positive Transmission Completion (ACK) status is received for a given retransmitted PDU, (a) searching the PRIQ for a third information element corresponding to the Sequence Number of the PDU for which a NACK status was received, (b) when the Sequence Number of the PDU corresponding to the positive ACK status received is determined not to match a Sequence Number for the third information element in the PRIQ, performing (D), (E) and (F), and (c) when the Sequence Number of the PDU corresponding to the positive ACK status received is determined to match the Sequence Number for the third information element in the PRIQ, incrementing the PDU Segment Offset and the SDU Segment Offset by the Retransmitted PDU Size, decrementing the Remaining Length by subtracting the Retransmitted PDU size therefrom, when the Remaining Length in the PRIQ is zero, performing (D), (E) and (F), and when the Remaining Length is not equal to zero, performing (G)(a), G(b) and (G)(c) when a determination is a next positive Transmission Completion (ACK) status is received.

In one alternative, the method may further comprise: (H) controlling, by the processing device, repeatedly performing (D), (E), (F) and (G), until a result of a determination after (G) is performed is all SDUs received are transmitted successfully.

In accordance with an aspect of the present invention, an apparatus for processing a data packet for transmission in a wireless communication system may include: circuitry configured to control operations of: (A) when a data packet as a new Service Data Unit (SDU) is determined to be received from a first layer of a protocol used in the wireless communication system, creating, for a given new SDU, a new entry in an SDU Information Queue (SIQ) indicating: a Start Address set to a system memory address of the given new SDU, a Total Size set to a size of the given new SDU, a Remaining Length set to the size of the given new SDU, a Previous Pointer set to (i) an index of a previously received SDU in the SIQ, when the SIQ includes an entry for the previously received SDU, and (ii) null, when the given new SDU is a first received SDU, and a Next Pointer set to a next free element in the SIQ configured to store information of a next received SDU; (B) when a transmission resource is determined to be allocated and a retransmission. PDU is determined not to be pending in a PDU Retransmission Information Queue (PRIQ), (a) preparing a data packet as a Protocol Data Unit (PDU) at a second layer of the protocol for transmission, in which the second layer is at a lower level in the protocol than the first layer, (b) updating a PDU Information Queue (PIQ) by setting: a PDU Sequence Number of the PDU to a next sequence number in a predetermined range of sequence numbers, a Total Size to an entire size of the PDU, a Total Number of SDU. Segments packed to a total number of whole SDUs or SDU segments to be packed in the PDU, and a Pointer to a SDU Segment Information Queue (SSIQ) to an index of the SSIQ to be updated with information about the whole SDUs or SDU segments packed into the PDU; (c) setting the index of the SSIQ to be updated to an index in the SIQ of a SDU or a segment of an SDU packed in the PDU, (d) when a whole SDU or a first segment of a SDU is packed in the PDU, setting a SDU Segment Address Offset to the Start Address, (e) when a whole SDU or the first segment of a SDU is not packed in the PDU, setting the SDU Segment Address Offset to a sum of the Start Address and the Total Size less the Remaining Length, and (f) setting: a SDU Segment Length to a size of the SDU or the SDU segment packed in the PDU, a SDU Segment Offset to a memory address of the PDU in which the SDU or the SDU segment is packed, the Previous Pointer to an index of a most recently formed entry in the SSIQ, the Next Pointer to an index of a next free entry in the SSIQ, and the Remaining Length to (i) zero, when a whole SDU is packed in the PDU, and (ii) the Remaining length minus the SDU segment length, when at least one SDU segment remains and is not to be packed in the PDU; and (C) when a transmission resource is determined to be allocated and a retransmission PDU is determined to be pending in the PRIQ, updating the PRIQ by: setting a Retransmitted PDU Size equal to an allocated transmission resource size, and preparing a PDU segment as the retransmission PDU according to the allocated transmission resource size using a PDU Segment Offset and a SDU Segment Offset of the PRIQ.

In one alternative of the apparatus, the circuitry may be configured to control repeatedly performing (A), (B) and (C), until a result of a determination after (B) or (C) is performed is all new received SDUs in the SIQ have been transmitted as a given PDU and the PRIQ does not indicate any retransmission PDU is pending.

In one alternative of the apparatus, the PDU may include one or more SDUs or SDU Segments. In one alternative of the apparatus, retransmission of a given PDU may be prioritized over transmission of a new PDU, information for only one PDU Segment may be stored in the PRIQ at a time, and information for the PDU or PDU segment current being retransmitted may be stored in the PRIQ.

In one alternative of the apparatus, a first PDU to be retransmitted from at least one PDU to be retransmitted may be formed as the retransmission PDU.

In one alternative of the apparatus, the retransmission PDU may be one of (i) a same size as the first PDU when transmitted a first time, (ii) a segment of a previously transmitted PDU, and (iii) a segment of two previously transmitted PDUs.

In one alternative of the apparatus, a Number of Retransmissions for the PDU indicated in the PRIQ may be set to a value of one greater than a current value of the Number of Retransmissions when the PDU is transmitted, and the value of the Number of Retransmission may be initialized to zero.

In one alternative of the apparatus, the circuitry may be configured to control operations of: (D) when a positive Transmission Completion Status (ACK) is received for a given PDU having a given Sequence Number, searching the PIQ for an information element corresponding to the given Sequence Number, based on a Pointer to the SSIQ of the information element determined from the searching the PIQ, identifying an associated information element in the SSIQ, from an SIQ Index of the associated information element in the SSIQ, identifying an information element in the SIQ to which the Transmission Completion Status corresponds; (E) performing (D) until a positive ACK Status for all SDU segments of a given SDU is received, and when a positive ACK status for all SDU segments of the given SDU is determined to be received, releasing the information element in the SIQ corresponding to the given SDU and the information element in the SSQI corresponding to each SDU segment of the given SDU, updating the Next Pointer and the Previous Pointer with regard to each remaining element in the SIQ and the SSIQ, and releasing the information element in the PIQ corresponding to the Sequence Number of the PDU for which the Transmission Complete Status is received; and (F) when a negative Transmission Completion (NACK) status is received for a given unsuccessfully transmitted PDU, searching the PIQ for a second information element corresponding to a Sequence Number of the given unsuccessfully transmitted PDU, based on a Pointer to the SSIQ in the PDU determined from the second information element, identifying an associated information element in the SSQI, and setting: the PDU Segment Offset to zero, the SDU Segment Offset by indexing into the associated information element of the SSQI identified based on the Pointer to the SSIQ of the second information element determined from the searching the PIQ, and the Remaining Length to Total Size from the PIQ.

In one alternative of the apparatus, the circuitry may be configured to control operations of: (G) when the positive Transmission Completion (ACK) status is received for a given retransmitted PDU, (al) searching the PRIQ for a third information element corresponding to the Sequence Number of the PDU for which a NACK status was received, (b) when the Sequence Number of the PDU corresponding to the positive ACK status received is determined not to match a Sequence Number for the third information element in the PRIQ, performing (D), (E) and (F), and (c) when the Sequence Number of the PDU corresponding to the positive ACK status received is determined to match the Sequence Number for the third information element in the PRIQ, incrementing the PDU Segment Offset and the SDU Segment Offset by the Retransmitted PDU Size, decrementing the Remaining Length by subtracting the Retransmitted PDU size therefrom, when the Remaining Length in the PRIQ is zero, performing (D), (E) and (F), and when the Remaining Length is not equal to zero, performing (G)(a), G(b) and G(c) when a determination is a next positive Transmission Completion (ACK) status is received.

In one alternative of the apparatus, the circuitry may be configured to control operations of: (H) controlling, by the processing device, repeatedly performing (D), (E), (F) and (G), until a result of a determination after (G) is performed is all. SDUs received are transmitted successfully.

A wireless communication device comprising: a receiver to receive a data packet in a wireless communication system; and a processing device to control operations of: (A) when a data packet as a new Service Data Unit (SDU) is determined to be received from a first layer of a protocol used in the wireless communication system, creating, for a given new SDU, a new entry in an SDU Information Queue (SIQ) indicating: a Start Address set to a system memory address of the given new SDU, a Total Size set to a size of the given new SDU, a Remaining Length set to the size of the given new SDU, a Previous Pointer set to (i) an index of a previously received SDU in the SIQ, when the SIQ includes an entry for the previously received SDU, and (ii) null, when the given new SDU is a first received SDU, and a Next Pointer set to a next free element in the SIQ configured to store information of a next received SDU; (B) when a transmission resource is determined to be allocated and a retransmission PDU is determined not to be pending in a PDU Retransmission. Information Queue (PRIQ), (a) preparing a data packet as a Protocol Data Unit (PDU) at a second layer of the protocol for transmission, in which the second layer is at a lower level in the protocol than the first layer, (b) updating a PDU Information Queue (PIQ) by setting: a PDU Sequence Number of the PDU to a next sequence number in a predetermined range of sequence numbers, a Total Size to an entire size of the PDU, a Total Number of SDU Segments packed to a total number of whole SDUs or SDU segments to be packed in the PDU, and a Pointer to a SDU Segment. Information Queue (SSIQ) to an index of the SSIQ to be updated with information about the whole SDUs or SDU segments packed into the PDU; (c) setting the index of the SSIQ to be updated to an index in the SIQ of a SDU or a segment of an SDU packed in the PDU, (d) when a whole SDU or a first segment of a SDU is packed in the PDU, setting a SDU Segment Address Offset to the Start Address, (e) when a whole SDU or the first segment of a SDU is not packed in the PDU, setting the SDU Segment Address Offset to a sum of the Start Address and the Total Size less the Remaining Length, and (f) setting: a SDU Segment Length to a size of the SDU or the SDU segment packed in the PDU, a SDU Segment Offset to a memory address of the PDU in which the SDU or the SDU segment is packed, the Previous Pointer to an index of a most recently formed entry in the SSIQ, the Next Pointer to an index of a next free entry in the SSIQ, and the Remaining Length to (i) zero, when a whole SDU is packed in the PDU, and (ii) the Remaining length minus the SDU segment length, when at least one SDU segment remains and is not to be packed in the PDU; and (C) when a transmission resource is determined to be allocated and a retransmission PDU is determined to be pending in the PRIQ, updating the PRIQ by: setting a Retransmitted PDU Size equal to an allocated transmission resource size, and preparing a PDU segment as the retransmission PDU according to the allocated transmission resource size using a PDU Segment Offset and a SDU Segment Offset of the PRIQ.

BRIEF DESCRIPTION OF THE DRAWINGS

FIG. 7A illustrates an example flow diagram for processing steps when a positive Transmission Completion status (ACK) is received for a PDU by a transmitter protocol entity according to aspects of the present invention.

FIGS. 7B and 7D illustrate an example flow diagram for processing steps when a negative. Transmission Completion status (NACK) is received for a PDU by a transmitter protocol entity according to aspects of the present invention.

FIG. 7C illustrates an example flow diagram for processing steps when a positive Transmission Completion status (ACK) is received for a retransmitted PDU by a transmitter protocol entity according to aspects of the present invention.

FIG. 8 illustrates details of the different information queues maintained by a receiver protocol entity according to the aspects of the present invention.

DETAILED DESCRIPTION

Figure 1:
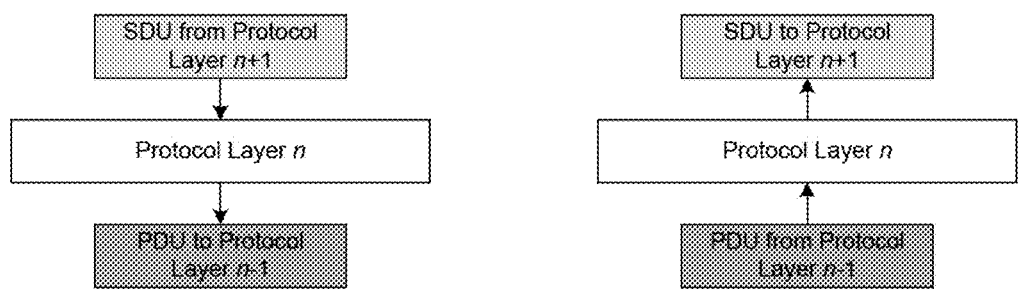
FIG. 1 illustrates a layered architecture of a data communication system.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the aspects of the invention are not intended to be limited to the specific terms used.

Figure 4:
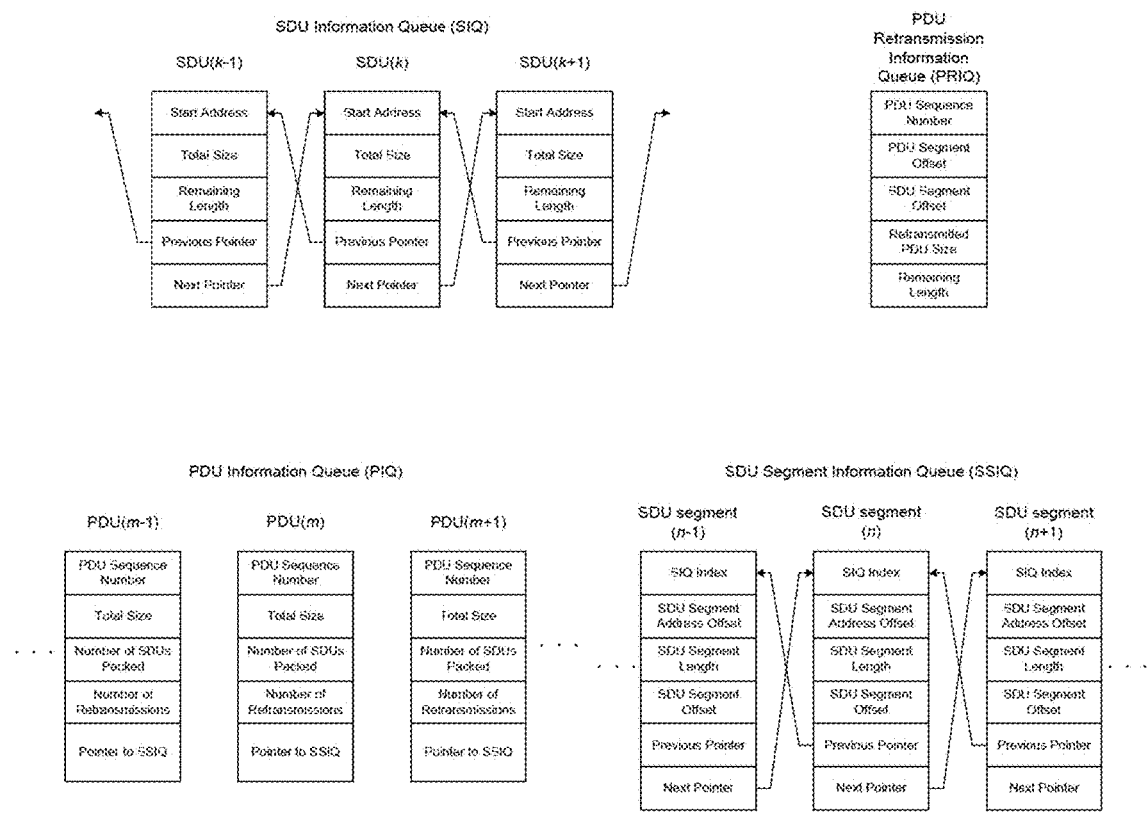
FIG. 4 illustrates details of the different information queues maintained by a transmitter protocol entity according to the aspects of the present invention.

The data packet processing is performed by maintaining the required information for the SDUs, PDUs and SDU segments in their respective information queues. According to an aspect of the present invention, in case where the PDU processing requires retransmission, an additional information queue namely "PDU Retransmission Information Queue" (PRIQ) may be created and maintained to enable virtual data packet processing as shown in FIG. 4. Next, each of the information queues is described in detail.

The SDU Information Queue (SIQ) maintains the following information:
- Start Address of an SDU
- Total Size of an SDU
- Remaining Length after an SDU has been segmented
- Previous Pointer and Next Pointer to form bidirectional link between each element in the SIQ for fast traversal through the elements in the queue.

The PDU Information Queue (PIQ) maintains the following information:
- PDU Sequence Number
- Total Size of a PDU
- Total number of SDU segments packed into a PDU
- Number of Retransmissions performed on the PDU
- Pointer to SDU Segment Information Queue (SSIQ). Each SDU segment in a PDU has an element in the SSIQ.

The SSIQ maintains the following information:
- SIQ Index for an SDU to which a SDU segment belongs. This index is required to link the SDU segment information element directly to the SIQ when providing the Transmission Completion status for the application or upper layer and to release the memory of the SDU.
- SDU Segment Address Offset
- SDU Segment Length
- SDU Segment Offset
- Previous Pointer and Next Pointer to form bidirectional link between each element in the SSIQ for fast traversal through the elements in the queue.

The PRIQ maintains the following information:
- Sequence Number of PDU that is undergoing further segmentation and retransmission
- PDU Segment Offset
- SDU Segment Offset
- Retransmitted PDU Size
- Remaining Length to be transmitted in the PDU for next transmission According to the aspects of the present invention, a field named "Number of Retransmissions" is included in the information element for the PIQ. Whenever a PDU is transmitted for the first time, the value of this field may be initialized to zero.

Figure 2:
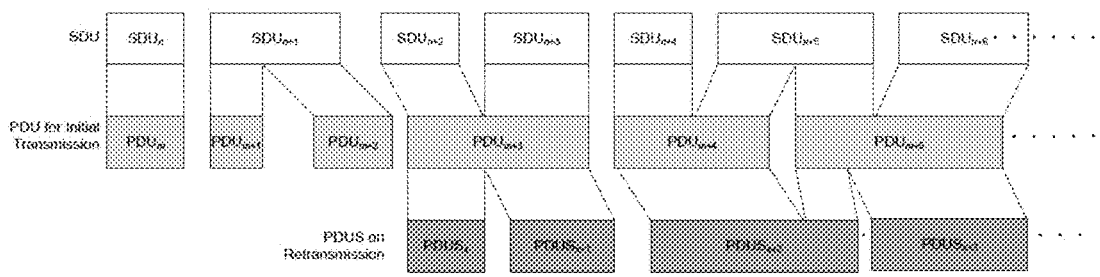
FIG. 2 illustrates example segmentation and packing scenarios in a protocol entity at the transmitter side.
Figure 3:
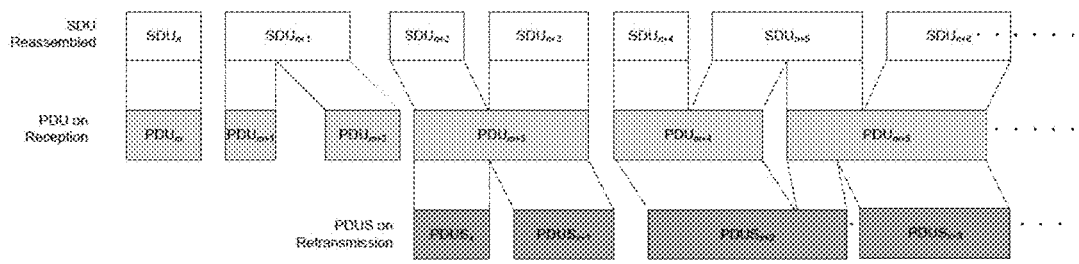
FIG. 3 illustrates an example reassembly and unpacking scenarios in a protocol entity at the receiver side.
Figure 5:
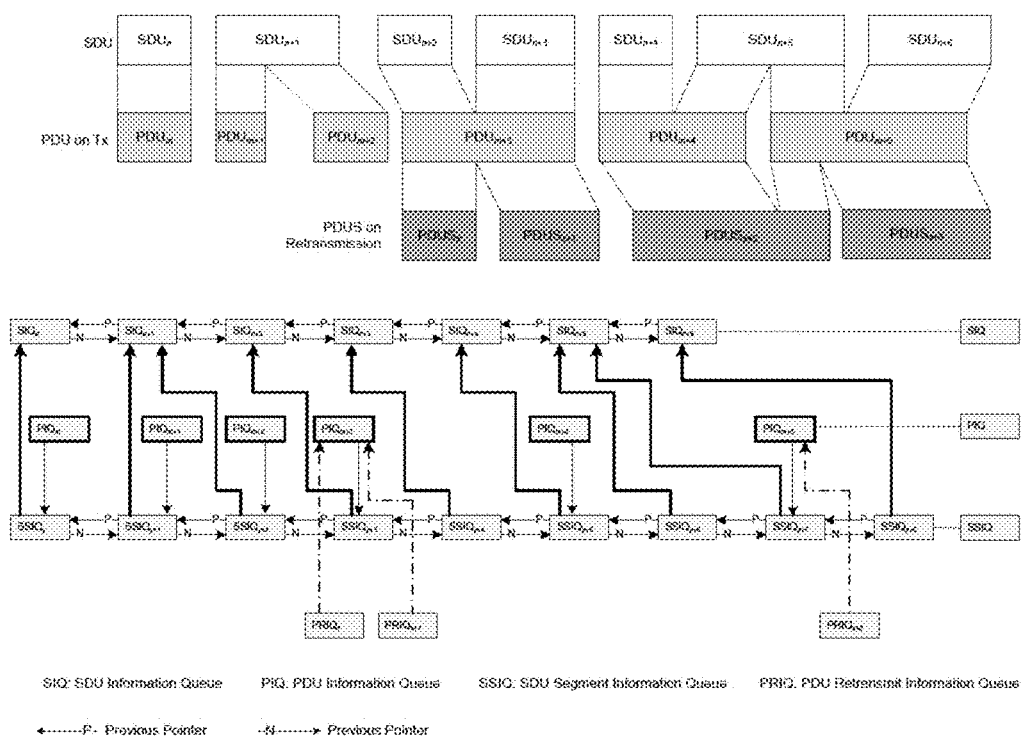
FIG. 5 illustrates example interactions amongst different queues by a transmitter protocol entity according to the aspects of the present invention.

The relationship among the four queues is illustrated in FIG. 5. According to the ARQ protocols, the retransmissions PDUs may be prioritized over new transmissions of PDUs. Based on this prioritization of retransmission PDUs, according to the aspects of the present invention, the PRIQ stores only one PDU segment information at a given time and stores the information for the PDU or PDU segment which is currently being retransmitted. According to the aspects of the present invention, the single element in PRIQ enables performing all the data processing required for all the pending PDU retransmissions. According to an aspect of the present invention, the PRIQ may take the first PDU to be retransmitted and form the retransmission PDU which may be the same size as the first time transmitted PDU, or the retransmission PDU may be a segment of a previously transmitted PDU, or the retransmission PDU may be segment of two PDUs which were to be retransmitted as shown in FIG. 2. The present disclosure enables the packet data processing for retransmission scenarios at any protocol layer without using any memory copy operation. This reduces the required clock cycles for memory copy operation which may be typically performed either by a processor or a Direct Memory Access (DMA) controller. Furthermore, not performing copy operation eliminates the need for allocation of multiple memories for the same data packet. Reduced copy operations and reduced memory storage requirements may lead to reduced power consumption.

According to the aspects of the present invention, whenever a NACK is received for a particular PDU sequence number, it is used to traverse the PIQ and the information element for the NACKed PDU my be identified. From this information element the information about the PDU may be updated in the PRIQ. The PDU Segment Offset field may be initialized to zero. The SDU Segment Offset field may also be updated by indexing into the SSIQ using the field Pointer to SSIQ of the identified element in PIQ. The Remaining Length field may be initialized to Total Size from the PIQ.

When transmission resources are allocated, a PDU Segment is prepared for retransmission and the PRIQ is updated as follows:
- The Retransmitted PDU Size field is set equal to the allocated transmission resources size.
- The retransmission PDU is prepared according to the allocated transmission resources size using the PDU Segment Offset and the SDU Segment Offset.

When a positive Transmission Completion (ACK) message is received, the PDU Sequence Number in the received message may be compared with the PDU Sequence Number field of the PRIQ. If the retransmitted PDU is positively acknowledged, the PDU Segment Offset and SDU Segment offset fields may be incremented by the value of the Retransmitted PDU Size field of the PRIQ. The Remaining Length field may be updated by subtracting the value of the Retransmitted PDU size field from the current value of the Remaining Length field. If the Remaining Length field becomes zero, the retransmission of a PDU is considered complete. The information element corresponding to the PDU Sequence Number of the original PDU in the PIQ is updated according to the aspects of the invention described in "METHOD AND APPARATUS FOR DATA PACKET PROCESSING", filed Jan. 11, 2016, U.S. application Ser. No. 14/992,229.

Figure 6A:
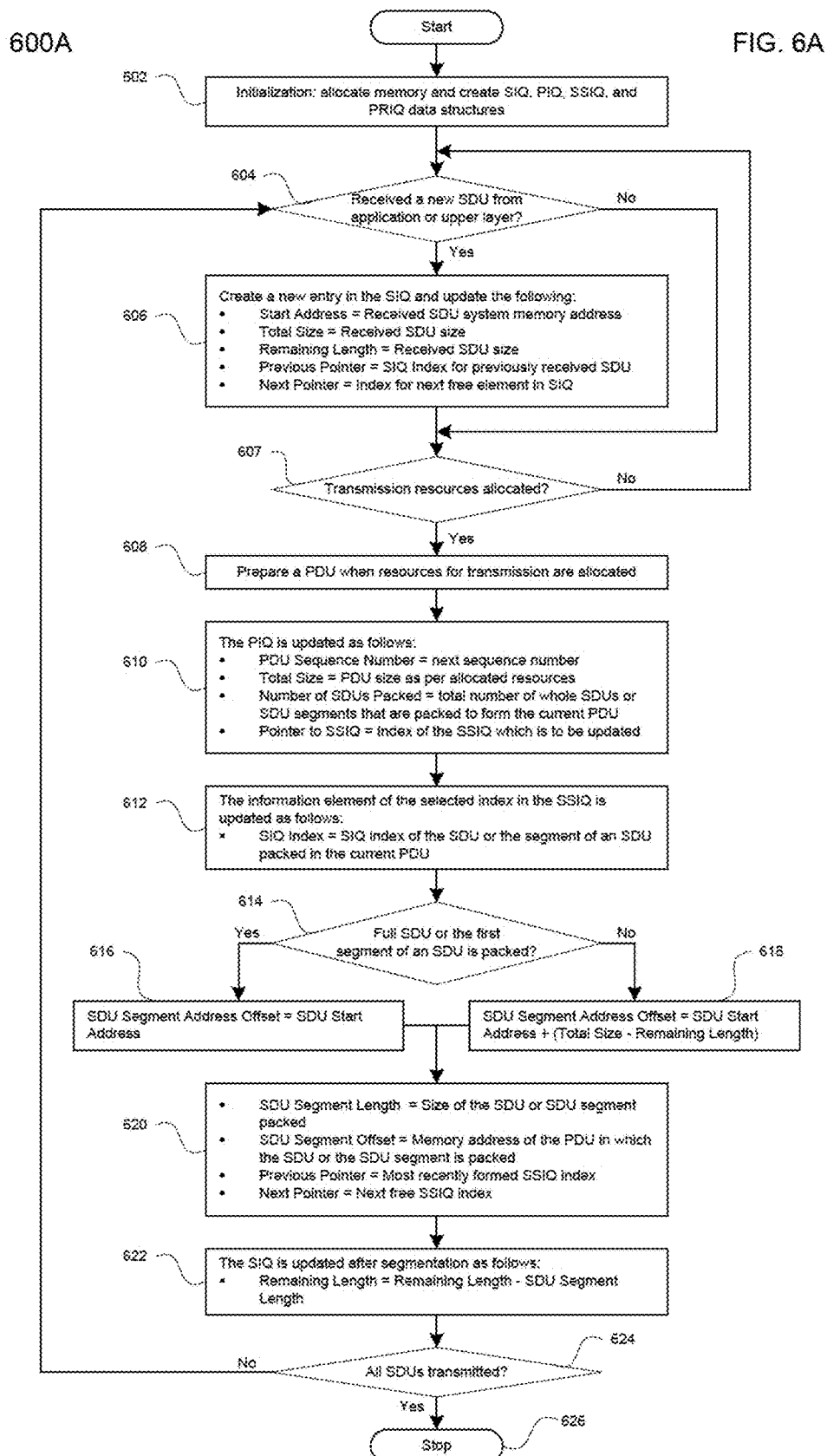
FIG. 6A illustrates an example flow diagram for processing steps when a new SDU is received at a transmitter protocol entity according to aspects of the present invention.

The transmitter side processing aspects of the present invention when there is no retransmission PDU pending are illustrated in the flow diagram 600A contained in FIG. 6. At processing stage 602, the SIQ, PIQ, SSIQ, and PRIQ data structures are created. At processing stage 604, a transmitter side protocol entity waits for a new SDU from an application or upper layer. If a new SDU is received, the processing flow continues at processing stage 606, where the various fields of the SIQ are updated. The Start Address is updated with the memory address of the newly received SDU. The Total Size field is set equal to the size of the newly received SDU. The Remaining Length field is also set equal to the size of the newly received SDU. The Previous Pointer is set to the index of a previously received SDU. In case of a very first SDU, the Previous Pointer is set to null to indicate the end of the queue. The Next Pointer is set to the next free element in the SIQ. The processing then continues at processing stage 607. Returning to processing stage 604, if no new SDU is received from an application or upper layer, the processing continues at processing stage 607. At processing stage 607, determination is made whether transmission resources are allocated or not. If transmission resources are not allocated, the processing returns to processing stage 604. If transmission resources are allocated, the processing continues at processing stage 608 where a PDU is prepared for transmission. Next at processing stage 610, the next free element in PIQ is updated. The PDU Sequence Number field is updated by the next sequence number in the range 0 to N−1 as described earlier. The Total Size field is updated according to the size of the allocated resources. The Number of SDUs Packed field is updated with the total number of SDUs or SDU segments packed to form the current PDU. The Pointer to SSIQ field is updated with the index of the SSIQ which is to be updated with the information about the SDUs or SDU segments that are packed in the current PDU. Next the processing continues at processing stage 612, where the SSIQ is updated. At processing stage 612, the SIQ Index field is updated with the SIQ index of the SDU or the SDU segment that is packed in the current PDU. At processing stage 614, a determination is made whether a complete SDU or a first segment of an SDU is packed in current PDU. If it is the complete SDU or the first segment of the SDU, the processing continues at processing stage 616 where the SDU Segment Address Offset field in the SSIQ is updated with the SDU Start Address. Returning to processing stage 614, if it is not the full SDU or the first segment of the SDU, the processing continues at processing stage 618 where the SDU Segment Address Offset field of the SSIQ is updated with the value (SDU Start Address+(Total Size−Remaining Length)). The further processing after stages 616 or 618 continues at processing stage 620 where the remaining fields of the SSIQ are updated. The SDU Segment Length field is updated with the size of the SDU or SDU segment packed. The SDU Segment Offset is updated with the memory address of the PDU in which the SDU or SDU segment is packed. The Previous Pointer is updated with the index of the most recently formed entry in the SSIQ. The Next Pointer is updated with the index of the next free element in the SSIQ. The processing then continues at processing stage 622 where the Remaining Length field in the SIQ index for the SDU that is packed in the current PDU is updated as Remaining Length=Remaining Length−SDU Segment Length. At processing stage 624, determination is made whether all the SDUs in the queue are transmitted or not. If not all the SDUs are transmitted then the processing continues at processing stage 604. If all the SDUs are transmitted then the processing suitably terminates at stage 626.

Figure 6B:
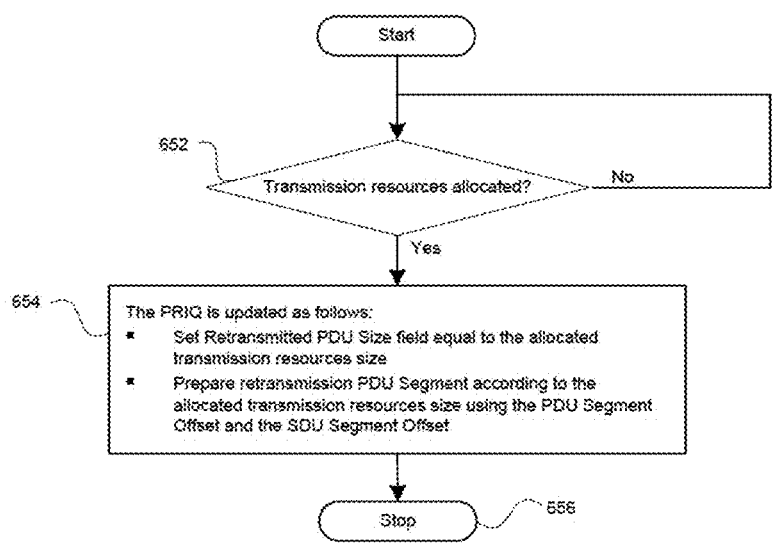
FIG. 6B illustrates an example flow diagram for processing steps when a retransmission PDU is pending in PRIQ and new transmission resources are allocated according to aspects of the present invention.

The transmitter side processing aspects of the present invention when a retransmission PDU is pending in the PRIQ are illustrated in the flow diagram 600B contained in FIG. 6B. At processing stage 652, the transmitter entity waits for transmission resources allocation. When transmission resources are allocated, the processing continues at stage 654 where a PDU Segment is prepared. The Retransmitted PDU Size field is set equal to the allocated transmission resources size. The retransmission PDU is prepared according to the allocated transmission resources size using the PDU Segment Offset and the SDU Segment Offset. The processing then suitably terminates at stage 656. The transmitter entity awaits for allocation of additional transmission resource for transmitting additional PDUs. It also waits for Transmission Completion status (ACK or NACK) from the peer entity.

The transmitter side processing aspects of the present invention when a positive Transmission Completion status (ACK) is received from the peer entity are illustrated in the flow diagram 700A contained in FIG. 7A. The processing relevant to the aspects of the present invention begins at processing stage 702, where the transmitter entity waits for receiving Transmission Completion status from peer entity. At processing stage 704, indication of Transmission Completion status for a PDU with a particular PDU Sequence Number is received from a peer entity. At processing stage 706, the PIQ is searched to find the element corresponding to the Sequence Number of the successfully transmitted PDU. From the found PIQ element, the Pointer to SSIQ field is used to identify the associated element in the SSIQ. At processing stage 710, from the identified SSIQ information element, the SIQ Index field is used to identify the SIQ information element to which the received Transmission Completion status corresponds. At processing stage 712, determination is made whether Transmission. Completion status is received for all the SDU segments of an SDU. If the Transmission Completion status is not received for all the SDU segments of an SDU, the processing returns to the processing stage 702. If the Transmission Completion status is received for all the SDU segments of an SDU, the processing continues at processing stage 714. At processing stage 714, the SIQ is updated by freeing the information element for the SDU whose transmission is completed successfully. The Previous and Next Pointers are updated to maintain the bidirectional link in the SIQ for the remaining elements in the queue. At processing stage 716, the information elements from SSIQ corresponding to the successfully transmitted SDU segments are freed. The Previous and Next Pointers are updated to maintain the bidirectional link in the SSIQ for the remaining elements in the queue. At processing stage 718, the information element from PIQ corresponding to the successfully transmitted PDU Sequence Number is freed. At processing stage 720, determination is made whether all the SDUs are transmitted successfully. If not all the SDUs are transmitted successfully, the processing returns to stage 702. Otherwise, the processing suitably terminates at stage 722.

Figure 7B:
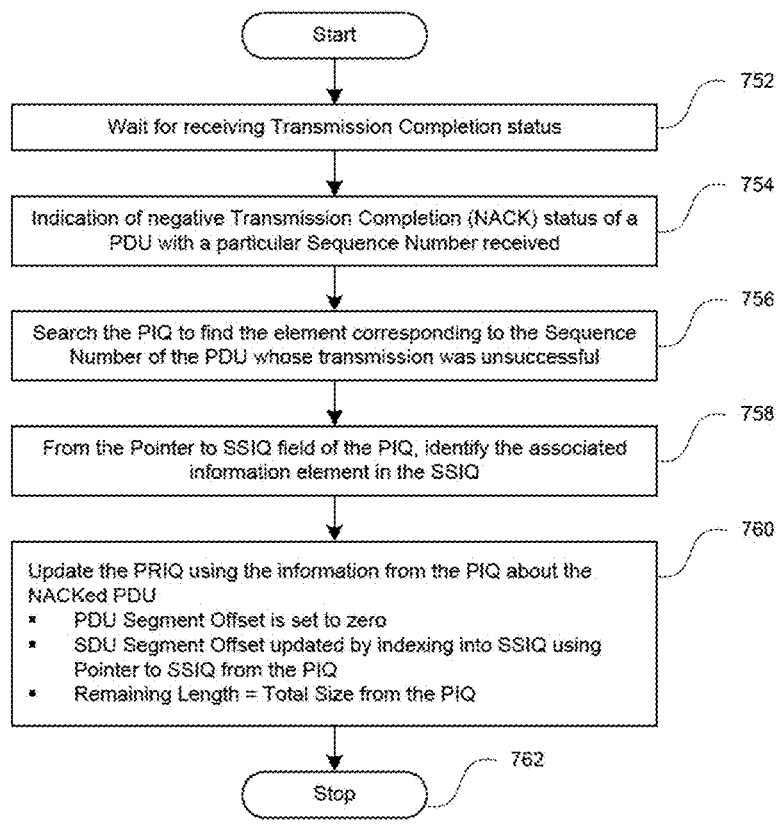

The transmitter side processing aspects of the present invention, when a negative Transmission Completion status (NACK) is received from the peer entity, are illustrated in the flow diagram 700B contained in FIG. 7B. The processing relevant to the present invention begins at processing stage 752, where the transmitter entity waits for receiving Transmission Completion status from the peer entity. Also referring to FIG. 7D, at processing stage 754, indication of negative Transmission Completion status (NACK) for a PDU with a particular PDU Sequence Number is received from the peer entity. At processing stage 756, the PIQ is searched to find the element corresponding to the Sequence Number of the PDU for which NACK is received. At processing stage 758, from the found PIQ element, the Pointer to SSIQ field is used to identify the associated element in the SSIQ. At processing stage 760, the PRIQ is updated using the information from the PIQ about the NACKed PDU. The PDU Segment offset in the PRIQ is set to zero. The SDU Segment Offset field may also be updated by indexing into the SSIQ element identified using the field Pointer to SSIQ of the identified element in PIQ. For example, in stages 754, 756, 758 and 760 and referring to FIGS. 4 and 7D, if the NACKed PDU Sequence Number matches the PDU Sequence Number field in the element PDU(m) in the PIQ, the value of the field "Pointer to SSIQ" is read from the PDU(m). If such read value refers to the SDU segment (n) in SSIQ, from the SDU segment (n) the value of "SDU Segment Offset" field is read and written into the "SDU Segment Offset" field of the PRIQ. Further in processing stage 760, the Remaining Length field may be initialized to Total Size from the PIQ. Now the PRIQ is ready to be used when a new transmission resources are allocated, the PDU referenced by the PRIQ may be prioritized for transmission. The processing suitably terminates at stage 762.

The transmitter side processing aspects of the present invention, when a positive Transmission Completion status (ACK) is received from the peer entity for a retransmitted PDU, are illustrated in the flow diagram 700C contained in FIG. 7C. The processing relevant to the aspects of the present invention begins at processing stage 772, where the transmitter entity waits for receiving Transmission Completion status from peer entity. At processing stage 74, indication of positive Transmission Completion status (ACK) for a retransmitted PDU with a particular PDU Sequence Number is received from a peer entity. At processing stage 776, the PRIQ is searched to find the element corresponding to the Sequence Number of the retransmitted PDU for which previously NACK was received. At processing stage 778, a determination is made whether the received ACK is for retransmitted PDU or not. If the ACK is not for a retransmitted PDU, the processing continues with off-page reference A to the flow diagram 700A in FIG. 7A. If the ACK is for a retransmitted PDU, the processing continues at processing stage 780. In the PRIQ, the PDU Segment Offset and SDU Segment Offset fields may be incremented by the value of the Retransmitted PDU Size field of the PRIQ. The Remaining Length field may be updated by subtracting the value of the Retransmitted PDU size field. At processing stage 782, determination is made whether the Remaining Length in PRIQ has become zero. If the Remaining Length field in PRIQ becomes zero, the retransmission of a PDU is considered complete. The processing then continues with off-page reference A to the flow diagram in FIG. 7A where the information element corresponding to the PDU Sequence Number of the original PDU in the PIQ is updated according to the processing steps in the flow diagram 700A. If the Remaining Length is not zero, the processing terminates for handling the currently received Transmission. Completion status and the processing flow returns to processing stage 772 where it awaits reception of next Transmission Completion status message from peer entity.

For the packet data processing at the reception side, similar method as that of the transmission side may be used. However, in this case PDUs are inputs and SDUs are formed as an output by the protocol entity.

Two different information queues are created and maintained in the receiving side to enable virtual data packet processing as shown in FIG. 8. Next, each of the information queues is described in detail.

Figure 9:
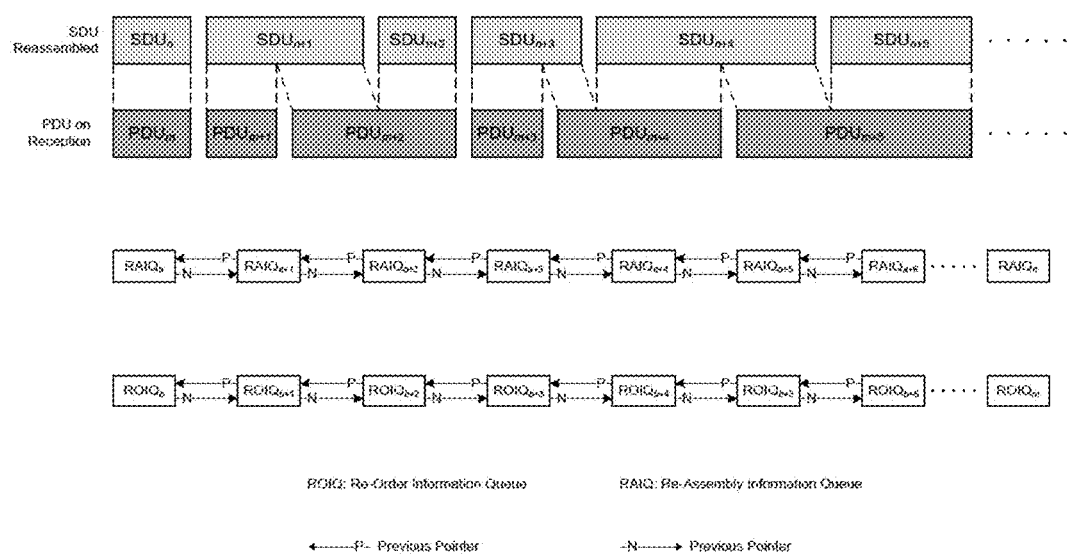
FIG. 9 illustrates example interactions amongst different queues by a receiver protocol entity according to the aspects of the present invention.
Figure 10:
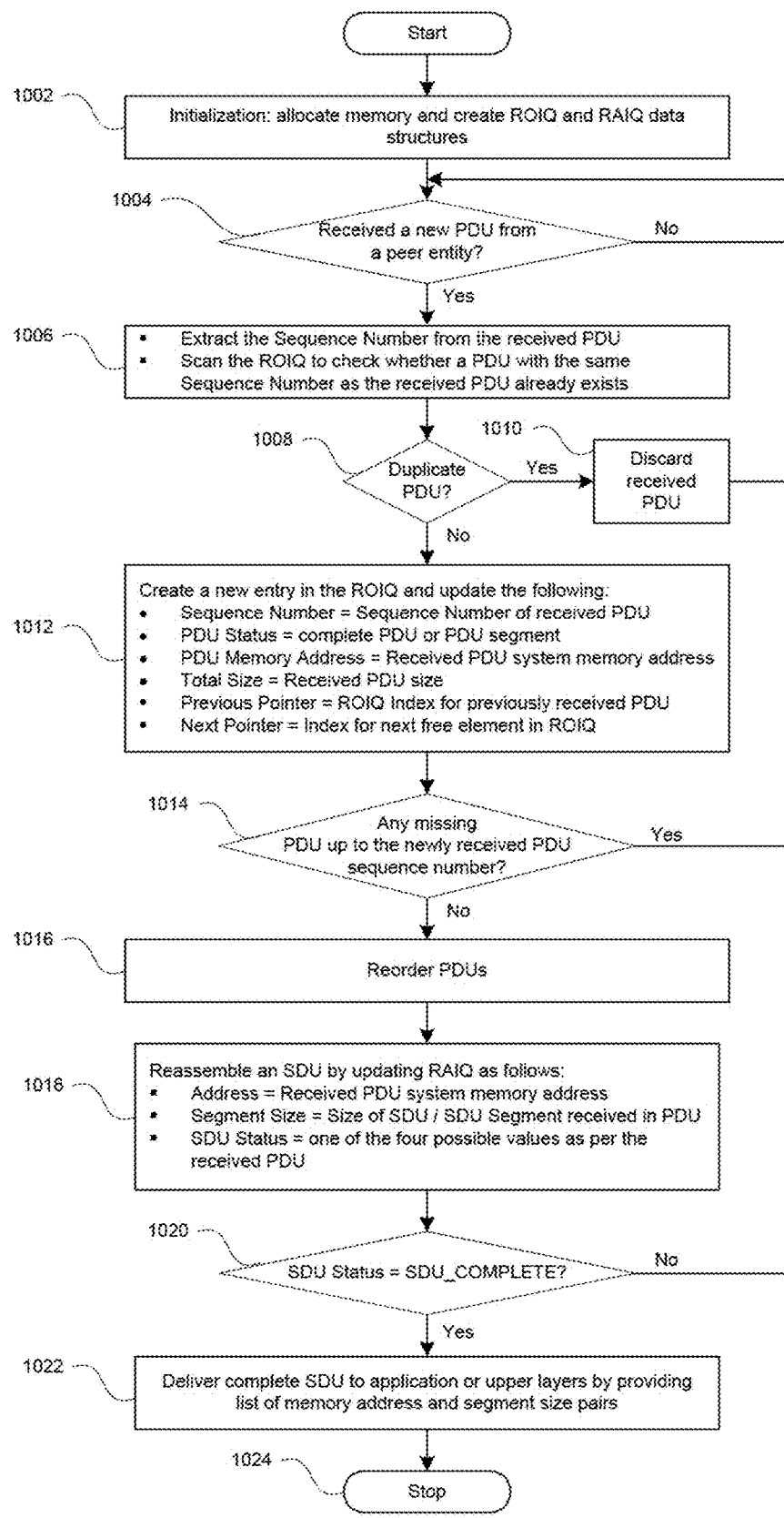
FIG. 10 illustrates an example flow diagram for processing steps when a new PDU is received at a receiver protocol entity according to aspects of the present invention.

The ReOrder Information Queue (ROIQ) maintains the following information:
 PDU Sequence Number
 Total Size of the received PDU
 PDU Memory Address
 PDU Status which indicates whether a complete PDU or only a segment of a PDU is received
 Previous and Next pointers to form bidirectional link between each element in the ROIQ for fast traversal of the elements in the queue The ReAssembly Information Queue (RAIQ) maintains the following information:
 The address where the SDU or SDU segment is present in the PDU memory
 SDU Segment Size
 SDU Status
  SDU_COMPLETE: The SDU is non-segmented
  SDU_FIRST_SEG: The SDU is segmented and is the first part of its parent SDU
  o SDU_LAST_SEG: The SDU is segmented and is the last part of its parent SDU
  o SDU_MIDDLE_SEG: The SDU is segmented and is an intermediate part of its parent SDU
 Previous and Next pointers to form bidirectional link between each element in the RAIQ for fast traversal of the elements in the queue The relationship among the two queues is illustrated in FIG. 9. According to another aspect of the present invention, the following are the steps performed in the packet data processing at the reception side when a PDU is received without a retransmission:
1. Detect and discard duplicate PDU and do reordering of the received PDUs
   a. If the sequence number of the newly received PDU already has an entry in the ROIQ then discard the recently received PDU as duplicate.
2. Whenever a PDU is received that is not a duplicate, create an entry in the ROIQ and update the following information:
   a. PDU Sequence Number with the received PDU Sequence Number
   b. PDU Status set to complete PDU if the PDU is complete PDU else the PDU status is set to PDU segment
   c. PDU Memory Address is set to the start memory address of the received PDU stored in the system memory
   d. Total Size of the PDU is set to the complete PDU size that is received
   e. The Previous and Next pointer are updated to maintain the bidirectional link
3. After the PDU information is stored in ROIQ, check if there is a possibility for SDU reassembly and if the reassembly is possible, update the entry in the RAIQ.
   a. If there is no missing PDU sequence number up to the newly received PDU sequence number then reorder the PDUs to start the SDU reassembly
   b. If an SDU is considered for reassembly then store the following information in the RAIQ:
      i. The address where the SDU or SDU segment is present in the PDU memory
      ii. SDU or SDU segment size received in the PDU
      iii. SDU Status set to either one of the following based on the information received in the PDU header
         o SDU_COMPLETE: The SDU is non-segmented
         o SDU_FIRST_SEG: The SDU is segmented and is the first part of its parent SDU
         o SDU_LAST_SEG: The SDU is segmented and is the last part of its parent SDU
         SDU_MIDDLE_SEG: The SDU is segmented and is an intermediate part of its parent SDU
      iv. When a complete SDU is received and when the SDU status is set to SDU_COMPLETE then deliver the complete SDU to the application or upper layer with the list consisting of memory offset and the size for each of the SDU segment that forms the complete SDU The receiver side processing aspects of the present invention are illustrated in the flow diagram contained in FIG. 10. At processing stage 1002, the ROIQ and RAIQ data structures are created. At processing stage 1004, a determination is made whether a new PDU is received from a peer entity. If a new PDU is not received, the processing stays at the same stage. If a new PDU is received, the processing continues at processing stage 1006, where the Sequence Number is extracted from the received PDU. The ROIQ is scanned to check whether there exists an entry with the same Sequence Number. At processing stage 1008, determination is made whether the newly received PDU is a duplicate or not. If a duplicate PDU is received, the processing continues at stage 1010, where the newly received PDU is discarded and the processing returns to the stage 1004. If the received PDU is not a duplicate, the processing continues at processing stage 1012, where a new entry is added in ROIQ and updated as follows. The Sequence Number field is updated with the sequence number of the received PDU. The PDU Status field is updated as either complete PDU or PDU segment depending on the received PDU headers. The PDU Memory Address field is updated with the received PDU system memory address. The Total Size field is updated with the size of the received PDU. The Previous Pointer field is updated with the ROIQ index of the previously received PDU. The Next Pointer is updated with the index of the next free element in the ROIQ. The processing then continues at stage 1014, where determination is made whether there are any missing PDUs up to the sequence number of the newly received PDU. If there are any missing PDUs, the processing returns to the stage 1004. If there are no missing PDUs, the processing continues at stage 1016, where the received PDUs are reordered for reassembly. At processing stage 1018, the reassembly of the PDUs to form an SDU is started by updating the RAIQ as follows. The Address field of the RAIQ is updated with the system memory address of the received PDU. The Segment Size field is updated with the size of the SDU or SDU segment received in the PDU. The SDU Status field is updated with one of the four possible values: SDU_COMPLETE, SDU_FIRST_SEG, SDU_LAST_SEG or SDU_MIDDLE_SEG. At processing stage 1020, the SDU Status in the RAIQ is checked. If the SDU Status of none of the elements in RAIQ is set to SDU_COMPLETE, the processing returns to the stage 1002. If the SDU Status is set to SDU_COMPLETE for at least one of the elements, the processing continues at processing stage 1022, where the complete SDU is delivered to an application or upper layer by providing the list of memory address and segment size pairs from the RAIN. The processing then suitably terminates at stage 1024.

According to the aspects of the present invention, the packet data processing at any layer may be performed without using any memory copy operation for retransmitted payload data. This reduces the required clock cycle for memory copy operation either from a processor or a Direct Memory Access (DMA) controller. Furthermore, not performing copy operation eliminates the need for allocation of multiple memories for the same packet data. Reduced copy operations and reduced storage requirements lead to reduced power consumption.

Aspects of the present invention may be applied to all types of mobile communications systems and the like, such as systems based on 3rd Generation Partnership Project (3GPP) Long Term Evolution (LTE) of wireless communication standard, systems based on 3GPP Wideband Code Division Multiple Access ("WCDMA") standard, systems based on an IEEE 802.16 wireless communication standard, etc.

Figure 11:
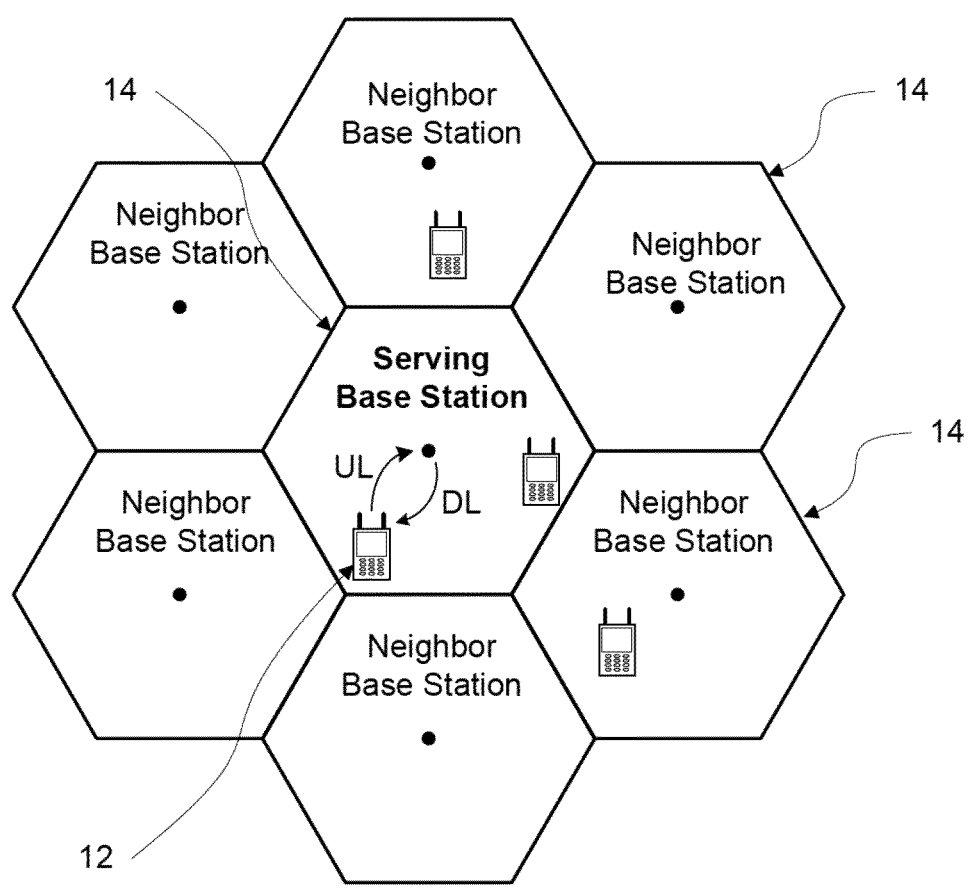
FIG. 11 illustrates a conventional mobile wireless communication system.

Typically, as shown in FIG. 11, a wireless communication system, which is a type of data communication system, comprises elements such as client terminals or mobile stations and one or more base stations. Other network devices may also be employed, such as a mobile switching center (not shown). As illustrated in FIG. 11, the communication path from the base station (BS) to the client terminal or mobile station (MS) is referred to herein as a downlink (DL) direction or downlink channel, and the communication path from the client terminal to the base station is referred to herein as an uplink (UL) direction or uplink channel. In some wireless communication systems, the MS communicates with the BS in both the DL and UL directions. For instance, such communication is carried out in cellular telephone systems. In other wireless communication systems, the client terminal communicates with the base stations in only one direction, usually the DL. Such DL communication may occur in applications such as paging. As used herein, the terms "base station" and "network" are used interchangeably.

By way of example only, the above-described method may be implemented in a receiver, e.g., a user device such as a wireless mobile station (MS) 12 as shown in FIG. 11.

Figure 12:
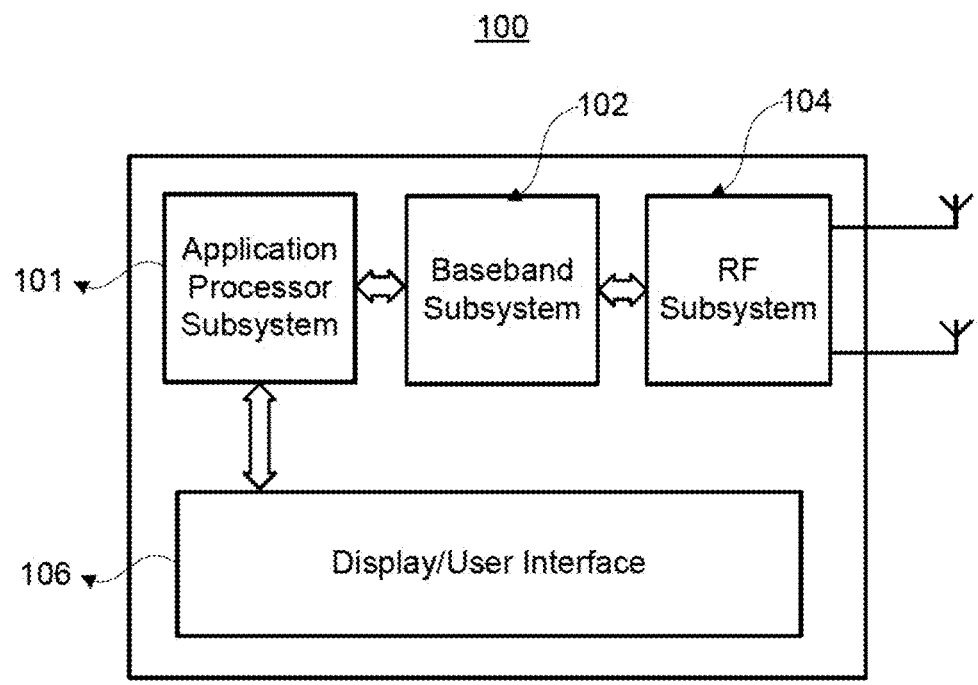
FIG. 12 illustrates a wireless mobile station diagram, which may be employed with aspects of the invention described herein.

As shown in FIG. 12, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 13:
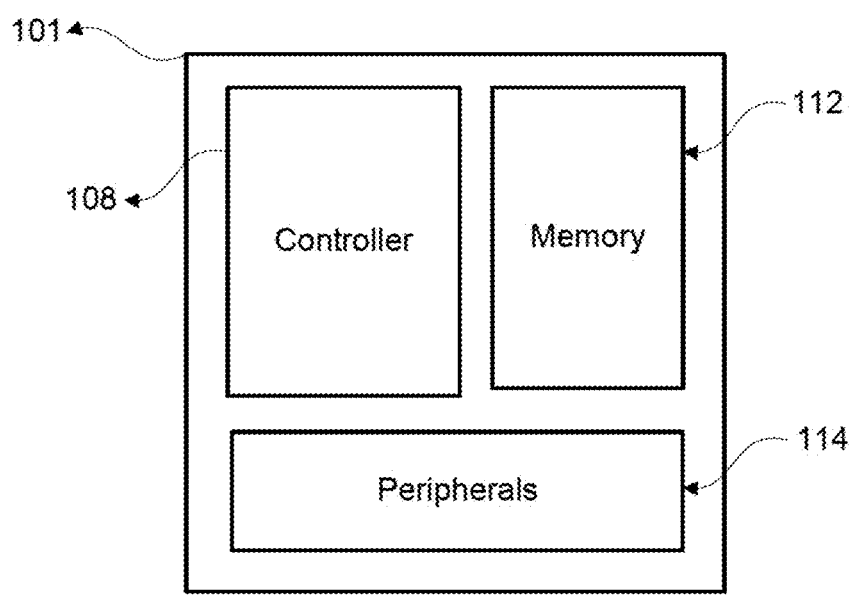
FIG. 13 illustrates an application processor subsystem for a wireless mobile station, which may be employed with aspects of the invention described herein.
Figure 14:
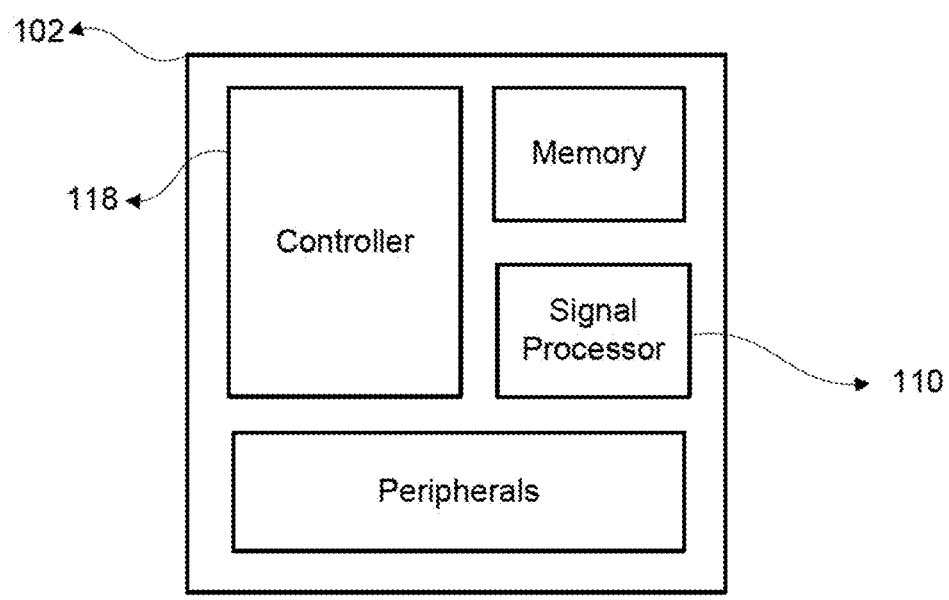
FIG. 14 illustrates a baseband subsystem for a wireless mobile station, which may be employed with aspects of the invention described herein.
Figure 15:
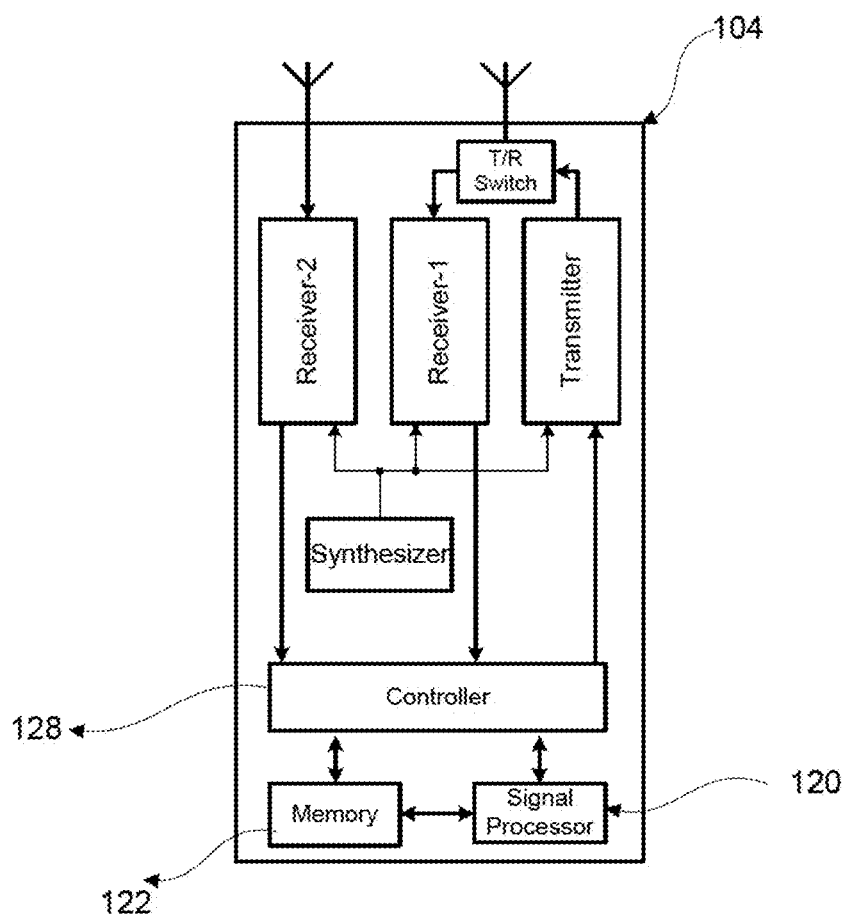
FIG. 15 illustrates a Radio Frequency (RF) subsystem for a wireless mobile station, which may be employed with aspects of the invention described herein.

The application processor subsystem 101 as shown in FIG. 13 may include a controller 108 such as a microcontroller, another processor or other circuitry. The baseband subsystem 102 as shown in FIG. 14 may include a controller 118 such as a microcontroller or other processor. The RF subsystem 104 as shown in FIG. 15 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present invention.

Peripherals 114 such as a full or partial keyboard, video or still image display, audio interface, etc may be employed and managed through the controller 108.

Aspects of the present invention may be implemented in firmware of the controller 108 of the application processor and/or the controller 118 of the baseband subsystem. In another alternative, aspects of the present invention may also be implemented as a combination of firmware and hardware of the application processor subsystem 101 and/or the baseband subsystem 102. For instance, a signal processing entity of any or all of the FIG. 14 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the invention may include smartphones, tablets, laptops, gaming consoles, cameras, video camcorders, TV, car entertainment systems, etc.

Although aspects of the invention herein have been described with reference to particular embodiments, it is to be understood that these embodiments are merely illustrative of the principles and applications of the aspects of the present invention. It is therefore to be understood that numerous modifications may be made to the illustrative embodiments and that other arrangements may be devised without departing from the spirit and scope of the aspects of the present invention as defined by the appended claims. Aspects of each embodiment may be employed in the other embodiments described herein.

The invention claimed is:

1. A method for processing a data packet for transmission in a wireless communication system, the method comprising:
   (A) controlling, by a processing device, when a data packet as a new Service Data Unit (SDU) is determined to be received from a first layer of a protocol used in the wireless communication system,
      creating, for a given new SDU, a new entry in an SDU Information Queue (SIQ) indicating:
         a Start Address set to a system memory address of the given new SDU,
         a Total Size set to a size of the given new SDU,
         a Remaining Length set to the size of the given new SDU,
         a Previous Pointer set to (i) an index of a previously received SDU in the SIQ, when the SIQ includes an entry for the previously received SDU, and (ii) null, when the given new SDU is a first received SDU, and
         a Next Pointer set to a next free element in the SIQ configured to store information of a next received SDU;
   (B) controlling, by the processing device, when a transmission resource is determined to be allocated and a retransmission PDU is determined not to be pending in a PDU Retransmission Information Queue (PRIQ),
      (a) preparing a data packet as a Protocol Data Unit (PDU) at a second layer of the protocol for transmission, in which the second layer is at a lower level in the protocol than the first layer,
      (b) updating a PDU Information Queue (PIQ) by setting:
         a PDU Sequence Number of the PDU to a next sequence number in a predetermined range of sequence numbers,
         a Total Size to an entire size of the PDU,
         a Total Number of SDU Segments packed to a total number of whole SDUs or SDU segments to be packed in the PDU, and
         a Pointer to a SDU Segment Information Queue (SSIQ) to an index of the SSIQ to be updated with information about the whole SDUs or SDU segments packed into the PDU;
      (c) setting the index of the SSIQ to be updated to an index in the SIQ of a SDU or a segment of an SDU packed in the PDU,
      (d) when a whole SDU or a first segment of a SDU is packed in the PDU, setting a SDU Segment Address Offset to the Start Address,
      (e) when a whole SDU or the first segment of a SDU is not packed in the PDU, setting the SDU Segment Address Offset to a sum of the Start Address and the Total Size less the Remaining Length, and
      (f) setting:
         a SDU Segment Length to a size of the SDU or the SDU segment packed in the PDU,
         a SDU Segment Offset to a memory address of the PDU in which the SDU or the SDU segment is packed,
         the Previous Pointer to an index of a most recently formed entry in the SSIQ,
         the Next Pointer to an index of a next free entry in the SSIQ, and
         the Remaining Length to (i) zero, when a whole SDU is packed in the PDU, and (ii) the Remaining length minus the SDU segment length, when at least one SDU segment remains and is not to be packed in the PDU; and
   (C) controlling, by the processing device, when a transmission resource is determined to be allocated and a retransmission PDU is determined to be pending in the PRIQ,
      updating the PRIQ by:
         setting a Retransmitted PDU Size equal to an allocated transmission resource size, and
         preparing a PDU segment as the retransmission PDU according to the allocated transmission resource size using a PDU Segment Offset and a SDU Segment Offset of the PRIQ.

2. The method of claim 1, further comprising:
   controlling, by the processing device, repeatedly performing (A), (B) and (C), until a result of a determination after (B) or (C) is performed is all new received SDUs in the SIQ have been transmitted as a given PDU and the PRIQ does not indicate any retransmission PDU is pending.

3. The method of claim 1, wherein the PDU includes one or more SDUs or SDU Segments.

4. The method of claim 1,
   wherein retransmission of a given PDU is prioritized over transmission of a new PDU,
   wherein information for only one PDU Segment is stored in the PRIQ at a time, and
   wherein information for the PDU or PDU segment current being retransmitted is stored in the PRIQ.

5. The method of claim 4, wherein a first PDU to be retransmitted from at least one PDU to be retransmitted is formed as the retransmission PDU.

6. The method of claim 5, wherein the retransmission PDU is one of (i) a same size as the first PDU when transmitted a first time, (ii) a segment of a previously transmitted PDU, and (iii) a segment of two previously transmitted PDUs.

7. The method of claim 1, wherein a Number of Retransmissions for the PDU indicated in the PRIQ is set to a value of one greater than a current value of the Number of Retransmissions when the PDU is transmitted, and wherein the value of the Number of Retransmission is initialized to zero.

8. The method of claim 1, further comprising:
   (D) controlling, by the processing device, when a positive Transmission Completion Status (ACK) is received for a given PDU having a given Sequence Number,
      searching the PIQ for an information element corresponding to the given Sequence Number,
      based on a Pointer to the SSIQ of the information element determined from the searching the PIQ, identifying an associated information element in the SSIQ,
      from an SIQ Index of the associated information element in the SSIQ, identifying an information element in the SIQ to which the Transmission Completion Status corresponds;
   (E) controlling, by the processing device,
      performing (D) until a positive ACK Status for all SDU segments of a given SDU is received, and when a positive ACK status for all SDU segments of the given SDU is determined to be received, releasing the information element in the SEQ corresponding to the given SDU and the information element in the SSQI corresponding to each SDU segment of the given SDU, updating the Next Pointer and the Previous Pointer with regard to each remaining element in the SIQ and the SSIQ, and releasing the information element in the PIQ corresponding to the Sequence Number of the PDU for which the Transmission Complete Status is received; and (F) controlling, by the processing device, when a negative Transmission Completion (NACK) status is received for a given unsuccessfully transmitted PDU, searching the PIQ for a second information element corresponding to a Sequence Number of the given unsuccessfully transmitted PDU, based on a Pointer to the SSIQ in the PDU determined from the second information element, identifying an associated information element in the SSQI, setting:

the PDU Segment Offset to zero, the SDU Segment Offset by indexing into the associated information element of the SSQI identified based on the Pointer to the SSIQ of the second information element determined from the searching the PIQ, and the Remaining Length to Total Size from the PIQ.

9. The method of claim 8, further comprising:

(G) controlling, by the processing device, when the positive Transmission Completion (ACK) status is received for a given retransmitted PDU, (a) searching the PRIQ for a third information element corresponding to the Sequence Number of the PDU for which a NACK status was received, (b) when the Sequence Number of the PDU corresponding to the positive ACK status received is determined not to match a Sequence Number for the third information element in the PRIQ, performing (D), (E) and (F), and (c) when the Sequence Number of the PDU corresponding to the positive ACK status received is determined to match the Sequence Number for the third information element in the PRIQ, incrementing the PDU Segment Offset and the SDU Segment Offset by the Retransmitted PDU Size, decrementing the Remaining Length by subtracting the Retransmitted PDU size therefrom, when the Remaining Length in the PRIQ is zero, performing (D), (E) and (F), and when the Remaining Length is not equal to zero, performing (G)(a), G(b) and (G)(c) when a determination is a next positive Transmission Completion (ACK) status is received.

10. The method of claim 9, further comprising:

(H) controlling, by the processing device, repeatedly performing (D), (E), (F) and (G), until a result of a determination after (G) is performed is all SDUs received are transmitted successfully.

11. An apparatus for processing a data packet for transmission in a wireless communication system, the apparatus comprising:

circuitry configured to control operations of:

(A) when a data packet as a new Service Data Unit (SDU) is determined to be received from a first layer of a protocol used in the wireless communication system, creating, for a given new SDU, a new entry in an SDU Information Queue (SIQ) indicating:

a Start Address set to a system memory address of the given new SDU, a Total Size set to a size of the given new SDU, a Remaining Length set to the size of the given new SDU, a Previous Pointer set to (i) an index of a previously received SDU in the SIQ, when the SIQ includes an entry for the previously received SDU, and (ii) null, when the given new SDU is a first received SDU, and a Next Pointer set to a next free element in the SIQ configured to store information of a next received SDU;

(B) when a transmission resource is determined to be allocated and a retransmission PDU is determined not to be pending in a PDU Retransmission Information Queue (PRIQ), (a) preparing a data packet as a Protocol Data Unit (PDU) at a second layer of the protocol for transmission, in which the second layer is at a lower level in the protocol than the first layer, (b) updating a PDU Information Queue (PIQ) by setting:

a PDU Sequence Number of the PDU to a next sequence number in a predetermined range of sequence numbers, a Total Size to an entire size of the PDU, a Total Number of SDU Segments packed to a total number of whole SDUs or SDU segments to be packed in the PDU, and a Pointer to a SDU Segment Information Queue (SSIQ) to an index of the SSIQ to be updated with information about the whole SDUs or SDU segments packed into the PDU;

(c) setting the index of the SSIQ to be updated to an index in the SIQ of a SDU or a segment of an SDU packed in the PDU, (d) when a whole SDU or a first segment of a SDU is packed in the PDU, setting a SDU Segment Address Offset to the Start Address, (e) when a whole SDU or the first segment of a SDU is not packed in the PDU, setting the SDU Segment Address Offset to a sum of the Start Address and the Total Size less the Remaining Length, and (f) setting:

a SDU Segment Length to a size of the SDU or the SDU segment packed in the PDU, a SDU Segment Offset to a memory address of the PDU in which the SDU or the SDU segment is packed, the Previous Pointer to an index of a most recently formed entry in the SSIQ, the Next Pointer to an index of a next free entry in the SSIQ, and the Remaining Length to (i) zero, when a whole SDU is packed in the PDU, and (ii) the Remaining length minus the SDU segment length, when at least one SDU segment remains and is not to be packed in the PDU; and (C) when a transmission resource is determined to be allocated and a retransmission PDU is determined to be pending in the PRIQ,
updating the PRIQ by:
setting a Retransmitted PDU Size equal to an allocated transmission resource size, and
preparing a PDU segment as the retransmission PDU according to the allocated transmission resource size using a PDU Segment Offset and a SDU Segment Offset of the PRIQ.

12. The apparatus of claim 11,
wherein the circuitry is configured to control repeatedly performing (A), (B) and (C), until a result of a determination after (B) or (C) is performed is all new received SDUs in the SIQ have been transmitted as a given PDU and the PRIQ does not indicate any retransmission PDU is pending.

13. The apparatus of claim 11, wherein the PDU includes one or more SDUs or SDU Segments.

14. The apparatus of claim 11,
wherein retransmission of a given PDU is prioritized over transmission of a new PDU,
wherein information for only one PDU Segment is stored in the PRIQ at a time, and
wherein information for the PDU or PDU segment current being retransmitted is stored in the PRIQ.

15. The apparatus of claim 14, wherein a first PDU to be retransmitted from at least one PDU to be retransmitted is formed as the retransmission PDU.

16. The apparatus of claim 15, wherein the retransmission PDU is one of (i) a same size as the first PDU when transmitted a first time, (ii) a segment of a previously transmitted PDU, and (iii) a segment of two previously transmitted PDUs.

17. The apparatus of claim 11, wherein a Number of Retransmissions for the PDU indicated in the PRIQ is set to a value of one greater than a current value of the Number of Retransmissions when the PDU is transmitted, and wherein the value of the Number of Retransmission is initialized to zero.

18. The apparatus of claim 11,
wherein the circuitry is configured to control operations of:
(D) when a positive Transmission Completion Status (ACK) is received for a given PDU having a given Sequence Number,
searching the PIQ for an information element corresponding to the given Sequence Number,
based on a Pointer to the SSIQ of the information element determined from the searching the PIQ, identifying an associated information element in the SSIQ,
from an SIQ Index of the associated information element in the SSIQ, identifying an information element in the SIQ to which the Transmission Completion Status corresponds;
(E) performing (D) until a positive ACK Status for all SDU segments of a given SDU is received, and
when a positive ACK status for all SDU segments of the given SDU is determined to be received,
releasing the information element in the SIQ corresponding to the given SDU and the information element in the SSQI corresponding to each SDU segment of the given SDU,
updating the Next Pointer and the Previous Pointer with regard to each remaining element in the SIQ and the SSIQ, and releasing the information element in the PIQ corresponding to the Sequence Number of the PDU for which the Transmission Complete Status is received; and
(F) when a negative Transmission Completion (NACK) status is received for a given unsuccessfully transmitted PDU,
searching the PIQ for a second information element corresponding to a Sequence Number of the given unsuccessfully transmitted PDU,
based on a Pointer to the SSIQ in the PDU determined from the second information element, identifying an associated information element in the SSQI, and
setting:
the PDU Segment Offset to zero,
the SDU Segment Offset by indexing into the associated information element of the SSQI identified based on the Pointer to the SSIQ of the second information element determined from the searching the PIQ, and
the Remaining Length to Total Size from the PIQ.

19. The apparatus of claim 18,
wherein the circuitry is configured to control operations of:
(G) when the positive Transmission Completion (ACK) status is received for a given retransmitted PDU,
(a) searching the PRIQ for a third information element corresponding to the Sequence Number of the PDU for which a NACK status was received,
(b) when the Sequence Number of the PDU corresponding to the positive ACK status received is determined not to match a Sequence Number for the third information element in the PRIQ, performing (D), (E) and (F), and
(c) when the Sequence Number of the PDU corresponding to the positive ACK status received is determined to match the Sequence Number for the third information element in the PRIQ,
incrementing the PDU Segment Offset and the SDU Segment Offset by the Retransmitted PDU Size,
decrementing the Remaining Length by subtracting the Retransmitted PDU size therefrom,
when the Remaining Length in the PRIQ is zero, performing (D), (E) and (F), and
when the Remaining Length is not equal to zero, performing (G)(a), G(b) and (G)(c) when a determination is a next positive Transmission Completion (ACK) status is received.

20. The apparatus of claim 19,
wherein the circuitry is configured to control operations of: (H) repeatedly performing (D), (E), (F) and (G), until a result of a determination after (G) is performed is all SDUs received are transmitted successfully.

21. A wireless communication device comprising:
a receiver to receive a data packet in a wireless communication system; and
a processing device to control operations of:
(A) when a data packet as a new Service Data Unit (SDU) is determined to be received from a first layer of a protocol used in the wireless communication system,
creating, for a given new SDU, a new entry in an SDU Information Queue (SIQ) indicating:
a Start Address set to a system memory address of the given new SDU,
a Total Size set to a size of the given new SDU,
a Remaining Length set to the size of the given new SDU, a Previous Pointer set to (i) an index of a previously received SDU in the SIQ, when the SIQ includes an entry for the previously received SDU, and (ii) null, when the given new SDU is a first received SDU, and a Next Pointer set to a next free element in the SIQ configured to store information of a next received SDU;

(B) when a transmission resource is determined to be allocated and a retransmission PDU is determined not to be pending in a PDU Retransmission Information Queue (PRIQ), (a) preparing a data packet as a Protocol Data Unit (PDU) at a second layer of the protocol for transmission, in which the second layer is at a lower level in the protocol than the first layer, (b) updating a PDU Information Queue (PIQ) by setting:

a PDU Sequence Number of the PDU to a next sequence number in a predetermined range of sequence numbers, a Total Size to an entire size of the PDU, a Total Number of SDU Segments packed to a total number of whole SDUs or SDU segments to be packed in the PDU, and a Pointer to a SDU Segment Information Queue (SSIQ) to an index of the SSIQ to be updated with information about the whole SDUs or SDU segments packed into the PDU;

(c) setting the index of the SSIQ to be updated to an index in the SIQ of as SDU or a segment of an SDU packed in the PDU, (d) when a whole SDU or a first segment of a SDU is packed in the PDU, setting a SDU Segment Address Offset to the Start Address, (e) when a whole SDU or the first segment of a SDU is not packed in the PDU, setting the SDU Segment Address Offset to a sum of the Start Address and the Total Size less the Remaining Length, and (f) setting:

a SDU Segment Length to a size of the SDU or the SDU segment packed in the PDU, a SDU Segment Offset to a memory address of the PDU in which the SDU or the SDU segment is packed, the Previous Pointer to an index of a most recently formed entry in the SSIQ, the Next Pointer to an index of a next free entry in the SSIQ, and the Remaining Length to (i) zero, when a whole SDU is packed in the PDU, and (ii) the Remaining length minus the SDU segment length, when at least one SDU segment remains and is not to be packed in the PDU; and (C) when a transmission resource is determined to be allocated and a retransmission PDU is determined to be pending in the PRIQ, updating the PRIQ by:

setting a Retransmitted PDU Size equal to an allocated transmission resource size, and preparing a PDU segment as the retransmission PDU according to the allocated transmission resource size using a PDU Segment Offset and a SDU Segment Offset of the PRIQ.

* * * * *